United States Patent
Goldstein et al.

(10) Patent No.: US 11,971,945 B2
(45) Date of Patent: *Apr. 30, 2024

(54) SYSTEM FOR SYNCHRONIZATION OF CHANGES IN EDITED WEBSITES AND INTERACTIVE APPLICATIONS

(71) Applicant: Wix.com Ltd., Tel Aviv (IL)

(72) Inventors: Yuval Goldstein, Herzliya (IL); Amit Kaufman, Tel Aviv (IL); Oren Hollander, Rosh Ha'Ayin (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,996

(22) Filed: Nov. 30, 2022

(65) Prior Publication Data

US 2023/0105686 A1    Apr. 6, 2023

Related U.S. Application Data

(63) Continuation of application No. 16/747,000, filed on Jan. 20, 2020, now Pat. No. 11,544,347, which is a
(Continued)

(51) Int. Cl.
| G06F 16/00 | (2019.01) |
| G06F 16/23 | (2019.01) |
| G06F 16/958 | (2019.01) |

(52) U.S. Cl.
CPC ........ *G06F 16/958* (2019.01); *G06F 16/2379* (2019.01)

(58) Field of Classification Search
CPC .. G06F 16/958; G06F 16/2379; G06F 40/143; G06F 40/166
See application file for complete search history.

(56) References Cited

U.S. PATENT DOCUMENTS 6,300,947 B1 * 10/2001 Kanevsky ........... G06F 16/9577
715/866
6,633,878 B1    10/2003 Underwood
(Continued)

FOREIGN PATENT DOCUMENTS

| WO | 200227537 | 4/2002 |
| WO | 2002052381 | 7/2002 |
| WO | 2006060276 | 6/2006 |

OTHER PUBLICATIONS

International Search Report for corresponding PCT application PCT/IB2015/051037 dated Jul. 7, 2015.
(Continued)

*Primary Examiner* — Noosha Arjomandi
(74) *Attorney, Agent, or Firm* — HEIDI BRUN ASSOCIATES LTD.

(57) ABSTRACT

A system for modifying a website or interactive application, including a published database accessible via an end user data service to present the most up to date version of objects of the website, viewable and editable by at least one user, a draft database accessible via a designer data service and viewable and editable by at least one designer to store edits to the objects of the published database; a published database request handler to coordinate concurrent viewing and updating of the objects between the end user data service and the published database and a draft database request handler to coordinate concurrent viewing, editing and updating of the objects between the designer data service and the draft database and to merge edits and updates to the objects in both the published database and the draft database and to return the merged version of the objects without modifying the published database.

20 Claims, 13 Drawing Sheets

Related U.S. Application Data continuation of application No. 15/706,789, filed on Sep. 18, 2017, now Pat. No. 10,540,419, which is a continuation of application No. 14/619,903, filed on Feb. 11, 2015, now Pat. No. 9,805,134.

(60) Provisional application No. 61/938,166, filed on Feb. 11, 2014.

(56) References Cited

U.S. PATENT DOCUMENTS

| | | | |
|---|---|---|---|
| 7,996,357 B2 | 8/2011 | Smarr | |
| 8,136,133 B2 | 3/2012 | Walker | |
| 8,364,662 B1* | 1/2013 | Moyer | G06F 16/958 |
| | | | 707/706 |
| 8,433,142 B2 | 4/2013 | Deng | |
| 9,087,035 B1* | 7/2015 | Bandaru | G06F 40/186 |
| 9,805,134 B2 | 10/2017 | Goldstein | |
| 10,185,703 B2 | 1/2019 | Abrahami | |
| 10,540,419 B2* | 1/2020 | Goldstein | G06F 16/2379 |
| 10,789,412 B2 | 9/2020 | Abrahami | |
| 11,544,347 B2 | 1/2023 | Goldstein | |
| 2003/0058277 A1 | 3/2003 | Bowman-Amuah | |
| 2004/0060002 A1 | 3/2004 | Lucovsky | |
| 2004/0107175 A1* | 6/2004 | Hung | G06F 16/951 |
| 2004/0107214 A1* | 6/2004 | Hung | G06F 16/951 |
| 2005/0132346 A1 | 6/2005 | Tsantilis | |
| 2005/0289454 A1 | 12/2005 | Donelson | |
| 2006/0101064 A1 | 5/2006 | Strong | |
| 2006/0183100 A1 | 8/2006 | Voehl | |
| 2007/0192381 A1 | 8/2007 | Padmanabham | |
| 2007/0283011 A1 | 12/2007 | Rakowski | |
| 2007/0283049 A1 | 12/2007 | Rakowski | |
| 2008/0208869 A1 | 8/2008 | Van Riel | |
| 2009/0299998 A1 | 12/2009 | Kim | |
| 2010/0114823 A1 | 5/2010 | Sykes | |
| 2010/0262647 A1 | 10/2010 | Malek | |
| 2011/0161802 A1 | 6/2011 | Jia | |
| 2011/0321012 A1 | 12/2011 | Samantaray | |
| 2012/0084658 A1 | 4/2012 | Tsao | |
| 2012/0130945 A1 | 5/2012 | I Dalfo | |
| 2012/0254108 A1 | 10/2012 | Wedewer | |
| 2012/0265744 A1 | 10/2012 | Berkowitz | |
| 2013/0007062 A1 | 1/2013 | Dutta | |
| 2013/0031459 A1 | 1/2013 | Khorashadi | |
| 2013/0054404 A1 | 2/2013 | Garcia | |
| 2013/0110900 A1 | 5/2013 | Des Jardins | |
| 2013/0326333 A1* | 12/2013 | Hashmi | G06F 16/958 |
| | | | 715/234 |
| 2013/0326345 A1* | 12/2013 | Haggart | G06F 3/0486 |
| | | | 715/255 |
| 2014/0026048 A1 | 1/2014 | Spirer | |
| 2014/0136935 A1 | 5/2014 | Santillie | |
| 2014/0223313 A1 | 8/2014 | Aebi | |
| 2014/0229919 A1 | 8/2014 | Spiridonov | |
| 2014/0250360 A1* | 9/2014 | Jiang | G06F 40/197 |
| | | | 715/229 |
| 2014/0325349 A1 | 10/2014 | Riherd | |
| 2015/0186544 A1* | 7/2015 | Benedum | H04L 67/56 |
| | | | 715/234 |
| 2015/0227533 A1* | 8/2015 | Goldstein | G06F 40/143 |
| | | | 707/661 |
| 2021/0157866 A1* | 5/2021 | Perkins | G06F 16/958 |
| 2022/0253490 A1* | 8/2022 | Tai | G06F 8/71 |

OTHER PUBLICATIONS

Supplementary European Search Report for corresponding European application 15 74 8685.3 dated Aug. 11, 2017.

Software AG: "Tamino WebDAV Server", Internet Citation, May 2001 (May 2001), XP002446634, Retrieved from the Internet: URL: http://www.softwareag.com/XML/news/e-WP_WebDAV.pdf [retrieved on Jan. 1, 2007].

Extended European Search Report for corresponding European application 20 19 6149.7 dated Jan. 15, 2021.

* cited by examiner

POSSIBLE OPERATIONS:
- READ REQUEST;
- MODIFY REQUEST:
    - OBJECT RELATED:
        - ADD OBJECT;
        - DELETE OBJECT;
        - MODIFY OBJECT;
    - OBJECT SCEMA/TYPE RELATED:
        - ADD SCHEMA/TYPE;
        - DELETE SCHEMA/TYPE;
        - MODIFY SCHEMA/TYPE;
            - ADD A FIELD.
            - DELETE A FIELD.
            - RENAME A FIELD.
            - CHANGE TYPE OF FIELD.
            - CHANGE POSSIBLE VALUE LIST OF A FIELD:
                - ADD POSSIBLE VALUE.
                - DELETE POSSIBLE VALUE.
                - MODIFY POSSIBLE VALUE.
            - UNITE FIELDS;
            - SPLIT FIELDS;

FIG.5

SYSTEM FOR SYNCHRONIZATION OF CHANGES IN EDITED WEBSITES AND INTERACTIVE APPLICATIONS

CROSS REFERENCE TO RELATED APPLICATIONS

This application is a continuation of U.S. application Ser. No. 16/747,000 filed on Jan. 20, 2020, which is a continuation of U.S. application Ser. No. 15/706,789, filed Sep. 18, 2017, which is a continuation of U.S. application Ser. No. 14/619,903 filed Feb. 11, 2015 now issued as U.S. Pat. No. 9,805,134, which claims benefit from U.S. Provisional Patent Application No. 61/938,166, filed Feb. 11, 2014, all of which are hereby incorporated in their entirety by reference.

FIELD OF THE INVENTION

The present invention relates to websites and interactive applications generally and to updating versions in particular.

BACKGROUND OF THE INVENTION

Large-scale, interactive websites are often built using a website building system. Such a website building system often handles the creation of the website, as well as its deployment. In such a scenario, the website building system provides the design environment, as well as the server infrastructure which serve pages to users of the website. Such website building and deployment systems typically provide end-user data creation and editing capabilities, allowing user generated content to be added to the website (as well as user generated content modification and deletion).

These capabilities may include multi-level user generated content support, e.g. allowing some users to design a blog creation site, some users to create new blogs, some users to add blog entries and some users only to add talkbacks to existing blog entries. The website building and deployment system may further enable different visual editing and design capabilities at each level.

Thus, there is no clear separation between designers and end-users. Furthermore, some users may be technically-savvy and familiar with the system (e.g. professional designers) and some may be more incidental and possibly non-technical users.

Many website building and deployment systems use an underlying internal database or repository to store the details of the websites, pages, components and related information. In such systems, the displayed pages are generated based on the underlying object structure of the website. Some website building and deployment systems can also provide additional database access capabilities (e.g. for data list capability, database integration, content management system integration and the like). Such database/content management systems may be internal to the website building and deployment system, or an external database/content management system accessed by the website building and deployment system.

Such a database/content management system can also be used to store some website components, specific user generated content elements or any other data. As per the example above, the website building and deployment system may store the blog definition in its internal repository, but store blog entries and blog talkbacks in two additional external databases.

In many systems, the deployed (published) websites have to stay up and running at all times—there is no way to shut down the website which may be mission-critical to the site owner's business. However, site development and maintenance may require website changes. Such changes to the website may require modifying multiple areas in the database—and thus "break" the website if published before being completed. Furthermore, such website changes must be tested before being made available to website users. Designers responsible for the modification often need the option to apply changes or discard them, and possibly the option to roll-back to a previous version of the website even after the changes have been applied to the running system.

In addition, multiple designers (or users) may be working on website changes which should be applied to the running system while resolving conflicts between these changes. This could be a single large change, or multiple separate (possibly multi-area) changes.

Some website building and deployment systems support the integration of database information (also referred to as data lists). Such database information may be formatted, having a given structure defined by one or more database schemas. Changes to the website might require some of the schemas to be modified. However, the website should continue working while the schema has been changed. The schema change might be part of a larger change, so that additional website changes are required to make the entire combined change effective. Furthermore, as the website continues to work, designers and users (at various levels) might continue to add or modify data which is formatted according to previous schema versions.

The common solution is for the designers to use a separate copy or version of the website, known as the development version of the website. The changes are "released" to the publically available version of the site (known as production or public version of the site) only when finished and tested.

Furthermore, the designers may typically use a version control system to manage the elements of the website being edited. Version control systems allow the designer to create branches of the managed elements set, to make changes, to commit changes, to discard changes and rollback to a previous version.

SUMMARY OF THE PRESENT INVENTION

There is provided, in accordance with a preferred embodiment of the present invention. A system for modifying a website or interactive application, the system being implementable on a computing device, the system includes a published database accessible via an end user data service to present at least the most up to date version of objects of the website, the objects being at least one of schema defined, system defined and visual, viewable and editable by at least one user. The system also includes a draft database accessible via a designer data service and viewable and editable by at least one designer to store at least edits to the objects of the published database; a published database request handler to coordinate concurrent viewing and updating of the objects between the end user data service and the published database while the website is running; a draft database request handler to coordinate concurrent viewing, editing and updating of the objects between the designer data service and the draft database and to merge at least one of edits and updates to the objects from the published database and edits and updates to the objects in the draft database and to return the merged version of the objects to the at least one designer via the designers data service without modifying the published database while the website is running; and an auxiliary system to update the published database based on the editing and updating of the objects in the draft database via the designer data service.

Moreover, in accordance with a preferred embodiment of the present invention, the system includes a conflict resolver to resolve conflicts caused by incoming edits and updates from multiple sources.

Further, in accordance with a preferred embodiment of the present invention, the system includes a list database to store lists and list applications.

Still further, in accordance with a preferred embodiment of the present invention, the lists include list items defined according to a schema, and where a single list includes at least one of items constructed according to single schema version, items constructed according to multiple versions of a given schema and items constructed according to multiple schemas.

Additionally, in accordance with a preferred embodiment of the present invention, the system includes a version control system.

Moreover, in accordance with a preferred embodiment of the present invention, the draft database includes a deleted objects database to store a unique identifier of deleted objects from the draft database.

Further, in accordance with a preferred embodiment of the present invention, the draft database and the published database are combined in a single database.

Additionally, in accordance with a preferred embodiment of the present invention, the published database request handler and the draft database request handler comprise at least one of: an item adapter to perform adaptation of list items to different schema versions according to the requests using at least one of ID-based handling and change-based handling and to return the adapted list items through at least one of the end user data service and the designer data service; and a query rewriter to modify read queries made to at least one of the published database and the draft database to support the retrieval of the list items saved under different versions of a given schema based on the analysis of the query conditions against at least one of the default values field added and the default values field removed in different schema versions.

Moreover, in accordance with a preferred embodiment of the present invention, the draft database request handler includes an item type change handler to handle type definition modifications of the objects of the website according to the requests.

Further, in accordance with a preferred embodiment of the present invention, the conflict resolver includes a component comparer and merger to perform object oriented comparison and merging to determine different versions of the objects.

Still further, in accordance with a preferred embodiment of the present invention, the auxiliary system includes at least one of: an auto updater to notify the at least one designer via the designer data service as to changes made to a currently edited website by another at least one designer and to merge the changes to the currently edited website; a publisher to publish at least one of total changes and a subset of changes from the draft database to the published database and to clear the changes from the draft database; an archiver to store and retrieve at least one of full and partial archived versions of the objects in an archive database; an editing history recorder to record editing history during editing by the at least one designer into an editing history database; an editing history analyzer to analyze the editing history in the editing history database; a reverter to revert the objects held in the draft database to a version from the archived database, the version being at least one of an earlier or later than the currently edited version, and where the version from the archived database becomes the currently edited version and where the revert is limited to non-list data and includes support to tag attribute changes through tag editing history tracking or tag ID matching; a cloner to create copies of the published database and the draft database; and a database creator to create the published database and the draft database the first time they are used.

Additionally, in accordance with a preferred embodiment of the present invention, the auto updater includes a baseline distributer to monitor changes from a defined baseline version of the objects of the currently edited website in the draft database.

Further, in accordance with a preferred embodiment of the present invention, the conflict resolver includes a change set resolver to change set classification to integrate change sets received from at least two of the end user data service, the designer service and the version control system.

Still further, in accordance with a preferred embodiment of the present invention, the system also includes a request classifier to perform classification of incoming requests from the end user data service and the designer data service into at least one community; and a user classifier to access user profiles from a user profile repository.

Additionally, in accordance with a preferred embodiment of the present invention, the conflict resolver is at least one of automatic, semi-automatic and manual.

Moreover, in accordance with a preferred embodiment of the present invention the version control system also includes a branch handler to handle branch operations on the website.

Further, in accordance with a preferred embodiment of the present invention, the published database and the draft database are at least one of a database, an object repository, a markup language file collection and a file system.

Still further, in accordance with a preferred embodiment of the present invention, the published database and the draft database are at least one of in-memory, locally stored, remotely stored and cloud stored.

Additionally, in accordance with a preferred embodiment of the present invention, the edits are at least one of addition, deletion or modification.

Moreover, in accordance with a preferred embodiment of the present invention, the edits and updates are at least one of schema addition, schema deletion or schema change.

Further, in accordance with a preferred embodiment of the present invention, the edits are at least one of user originated, designer originated and system originated.

Still further, in accordance with a preferred embodiment of the present invention, the at least one community is at least one of user class, user type, designer defined criteria, user physical location, user access device type, user access method type and user geographical location.

Additionally, in accordance with a preferred embodiment of the present invention, the baseline distributer is activated by at least one of time and frequency setting, designer request, amount of accumulated changes, criticality of accumulated changes and designer pre-setting.

Moreover, in accordance with a preferred embodiment of the present invention, the classification is at least one of the interface used to create the change-set; the method used to create the change-set inside the specific interface; the identity of the user who created the change-set; the type of object or objects which were changed in the change-set; the specific objects which were changed in the change-set; the type of changes included in the change-set; the scope of the changes included in the change-set and the specification by the application designer.

Further, in accordance with a preferred embodiment of the present invention, the classification is according to at least one of the number of modified objects included in a change-set; the existence of specific changes to specific object attributes; the combined visual effect of a change-set and predefined rules and guidelines.

There is provided, in accordance with a preferred embodiment of the present invention. A method for modifying a website or interactive application, the method including presenting an updated version of objects from a published database of the website, the objects being at least one of schema defined, system defined and visual, viewable and editable by at least one user; viewing and editing a draft database of the website where the draft database stores at least edits to the objects of the published database; coordinating concurrent viewing and updating of the objects between the end user data service and the published database while the website is running; coordinating concurrent viewing, editing and updating of the objects between the designer data service and the draft database and merging at least one of edits and updates to the objects from the published database and edits and updates to the objects in the draft database and returning the merged version of the objects to the at least one designer via the designers data service without modifying the published database while the website is running; and updating the published database based on the editing and updating of the objects in the draft database via the designer data service.

Moreover, in accordance with a preferred embodiment of the present invention, the method includes resolving conflicts caused by incoming edits and updates from multiple sources.

Further, in accordance with a preferred embodiment of the present invention, the method includes storing lists and list applications in a list database.

Still further, in accordance with a preferred embodiment of the present invention, the lists include list items defined according to a schema, and where a single list includes at least one of items constructed according to single schema version, items constructed according to multiple versions of a given schema and items constructed according to multiple schemas.

Additionally, in accordance with a preferred embodiment of the present invention, the method includes using version control system.

Moreover, in accordance with a preferred embodiment of the present invention, the method also includes storing a unique identifier of deleted objects from the draft database in a deleted objects database.

Further, in accordance with a preferred embodiment of the present invention, the draft database and the published database are combined in a single database.

Additionally, in accordance with a preferred embodiment of the present invention, the coordinating concurrent viewing and updating of the objects between the end user data service and the published database and the coordinating concurrent viewing, editing and updating of the objects between the designer data service and the draft database and the merging and the updating comprise at least one of performing adaptation of list items to different schema versions according to the requests using at least one of ID-based handling and change-based handling; and returning the adapted list items through at least one of the end user data service and the designer data service; and modifying read queries made to at least one of the published database and the draft database to support the retrieval of the list items saved under different versions of a given schema based on the analysis of the query conditions against at least one of the default values field added and the default values field removed in different schema versions.

Moreover, in accordance with a preferred embodiment of the present invention, the coordinating concurrent viewing, editing and updating of the objects between the designer data service and the draft database and the merging and the updating includes handling type definition modifications of the objects of the website according to the requests.

Further, in accordance with a preferred embodiment of the present invention, the resolving conflicts includes performing object oriented comparison and merging to determine different versions of the objects.

Still further, in accordance with a preferred embodiment of the present invention, the coordinating concurrent viewing, editing and updating of the objects between the designer data service and the draft database and the merging and the updating includes handling type definition modifications of the objects of the website according to the requests.

Additionally, in accordance with a preferred embodiment of the present invention, the updating includes at least one of notifying the at least one designer via the designer data service as to changes made to a currently edited website by another at least one designer and merging the changes to the currently edited website; publishing at least one of total changes and a subset of changes from the draft database to the published database and clearing the changes from the draft database; storing and retrieving at least one of full and partial archived versions of the objects in an archive database; recording editing history during editing by the at least one designer into an editing history database; analyzing the editing history in the editing history database; reverting the objects held in the draft database to a version from the archived database, the version being at least one of an earlier or later than the currently edited version, and where the version from the archived database becomes the currently edited version and where the reverting is limited to non-list data and includes support to tag attribute changes through tag editing history tracking or tag ID matching; creating copies of the published database and the draft database; and creating the published database and the draft database the first time they are used.

Moreover, in accordance with a preferred embodiment of the present invention, the notifying and merging includes monitoring changes from a defined baseline version of the objects of the currently edited website in the draft database.

Further, in accordance with a preferred embodiment of the present invention, the resolving conflicts includes resolving change set classification to integrate change sets received from at least two of the end user data service, the designer service and the version control system.

Still further, in accordance with a preferred embodiment of the present invention, the method includes performing classification of incoming requests from the end user data service and the designer data service into at least one community; and accessing user profiles from a user profile repository.

Additionally, in accordance with a preferred embodiment of the present invention, the resolving conflicts is at least one of automatic, semi-automatic and manual.

Moreover, in accordance with a preferred embodiment of the present invention the method includes handling branch operations on the website.

Further, in accordance with a preferred embodiment of the present invention, the published database and the draft database are at least one of a database, an object repository, a markup language file collection and file system.

Still further, in accordance with a preferred embodiment of the present invention, the published database and the draft database are at least one of in-memory, locally stored, remotely stored and cloud stored.

Additionally, in accordance with a preferred embodiment of the present invention, the edits are at least one of addition, deletion or modification.

Moreover, in accordance with a preferred embodiment of the present invention, the edits and updates are at least one of schema addition, schema deletion or schema change.

Further, in accordance with a preferred embodiment of the present invention, the edits and updates are at least one of user originated, designer originated and system originated.

Still further, in accordance with a preferred embodiment of the present invention, the at least one community is at least one of user class, user type, designer defined criteria, user physical location, user access device type, user access method type and user geographical location.

Additionally, in accordance with a preferred embodiment of the present invention, the monitoring changes is activated by at least one of time and frequency setting, designer request, amount of accumulated changes, criticality of accumulated changes and designer pre-setting.

Moreover, in accordance with a preferred embodiment of the present invention, the performing classification is at least one of the interface used to create the change-set; the method used to create the change-set inside the specific interface; the identity of the user who created the change-set; the type of object or objects which were changed in the change-set; the specific objects which were changed in the change-set; the type of changes included in the change-set; the scope of the changes included in the change-set and the specification by the application designer.

Further, in accordance with a preferred embodiment of the present invention, the performing classification is according to at least one of the number of modified objects included in the change-set; the existence of specific changes to specific object attributes; the combined visual effect of the change-set and predefined rules and guidelines.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 is a schematic illustration of possible reading and modification operations;

Figure 1:
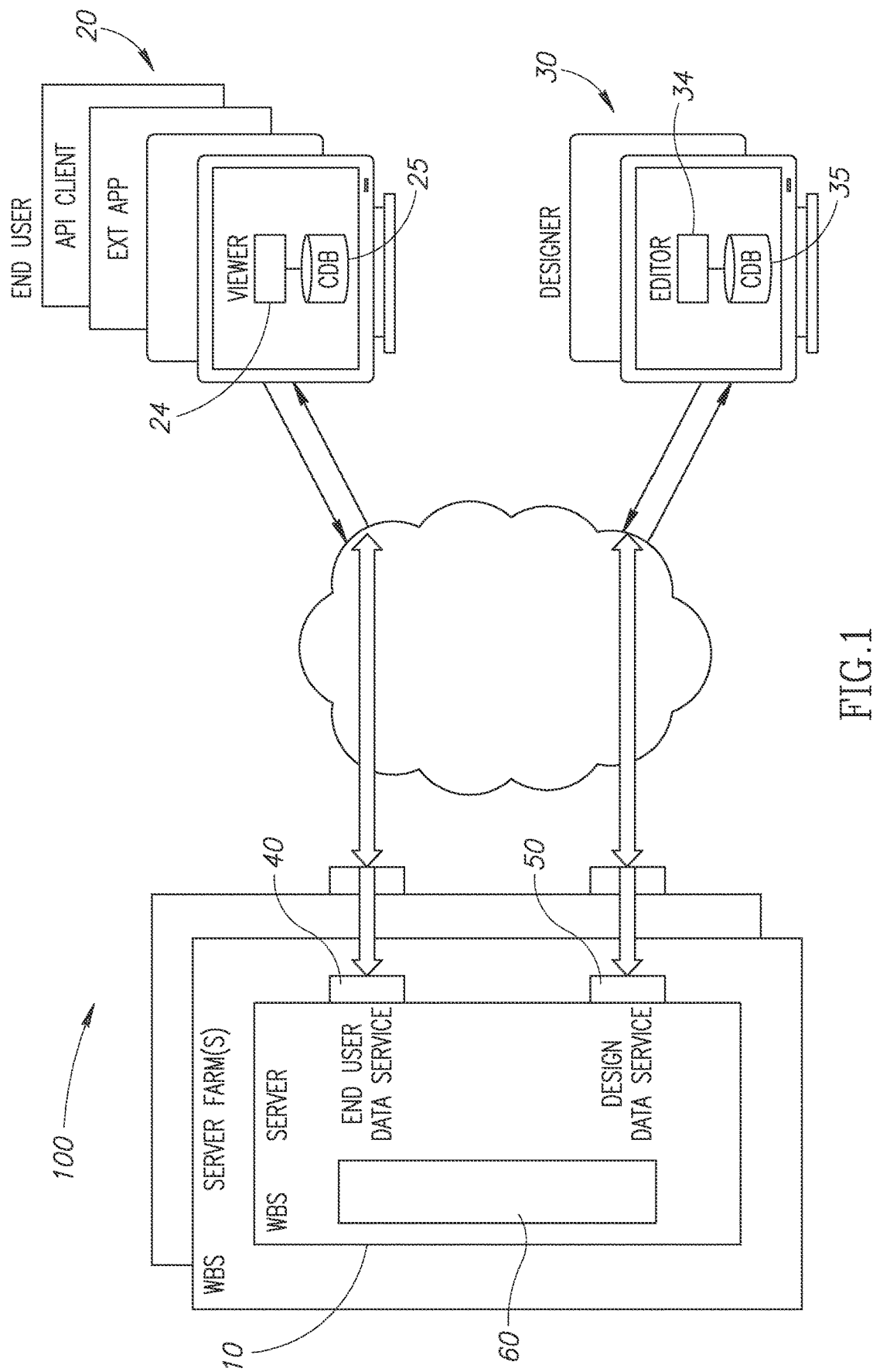
FIG. 1 is a schematic illustration of a system for synchronizing modifications to websites, constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that a website building system has to allow modifications to be done separately from the running site, so that changes may be evaluated and tested, and not affect the running website. Such a system should also support commit and rollback operations for created website versions.

Applicants have further realized that this requires the ability to modify and test the changes while the website is up and running. This requirement is compounded by the need to support multiple changes, possibly made by multiple users, which should be integrated into the running web site.

Applicants also realized that the use of a version control system as discussed herein above has a number of drawbacks and difficulties. For example, some websites are very large, and possibly contain large amounts of data being served, thus, the website cannot be easily duplicated and the designers would have to work on the existing website, or at least on a branch of the website maintained by the version control system. Branch creation may also be difficult or very time-consuming in a large-scale website.

Most commercial version control systems are aimed at the maintenance and handling of program source code, which is essentially a set of text files. However, the underlying elements managed by the website building and deployment system are typically object sets or database records and not text files (the displayed HTML files are dynamically generated and not separately managed).

Version control systems also make heavy use of the merging operation—for example when merging a modified branch with a baseline version that was also modified. High-quality or semi-automatic merging algorithms greatly aid in the integration of modified versions and the resolution of conflicts (e.g. resulting from changes made by multiple developers). However, version control systems also typically include text-based merging algorithms, focusing on text line differences and merging. These algorithms do not adapt well to object-based repositories. Furthermore, these algorithms do not use the object (or database) structure information to aid in the comparison.

Current systems also assume that users are divided into two separate and distinct classes: designers, who can modify the website and work through a version control system integrated with the website building and deployment system and end-users, who can only view the website, and work through the website building and deployment system which generates the viewed pages without using the version control system. However, such a dichotomic approach may be problematic when there are multiple "designer levels", and end-users may also modify the web site.

In another scenario, some of the users which modify the website may be non-technical (and possibly incidental) users, which are not familiar with version control system operation and methodology, e.g. they just want to add posts to a blogging website, and perform some design work on the layout of the blog post. If these non-technical users are required to use the version control system, they might find the system too difficult to use. On one hand, the version control system might require control of the underlying repository, so that all changes to this repository should be made through the version control system—making version control system bypassing impossible. On the other hand, if the system allows non-technical users to bypass the version control system (by accessing the site directly through the website building and deployment system), the system may lose the advantages conferred by the version control system (e.g. version management, merging capability etc.)

Furthermore, when a designer changes a website (working on a branch), other designers or users may still perform substantial modifications to the main website. Therefore the designer may be working on a separate, "frozen" branch of the website and may not be aware of these other changes, which might be relevant to his or her work.

It will be appreciated that for a website which includes an integrated database, a schema may be associated with a large number of data items in the integrated database. Changing the schema (e.g. adding a field) might require a change to be made in all associated items. Such a change may be time consuming—in particular if the changes have to be performed through a version control system which maintains an audit trail of all changes. This may also be a problem if the website is locked while the change is being made.

Reference is now made to FIG. 1 which illustrates a system 100 for synchronizing modifications to websites in accordance with an embodiment of the present invention. It will be appreciated that although system 100 is described in relation to websites, it may also be used in conjunction with other online interactive applications.

System 100 may manage the concurrent editing and viewing of a large object based website which may also include data lists by multiple users and designers. It will be appreciated that system 100 may employ multiple databases for the draft (currently edited) versions and the current published version as well as databases holding archives of previous versions of published databases. System 100 may be used without a version control system or may be used to compliment the functionality of a version control system as discussed in more detail herein below.

System 100 comprises a website building system server 10, a user client 20 and a designer client 30. Website building system server 10 further comprises an end user data service 40, a designer data service 50 and a modification processor 60. It will be appreciated that end user data service 40 and designer data service 50 may receive requests from both users and designers of the pertinent website from user client 20 and designer client 30 via a suitable communication medium such as the Internet. Modification processor 60 may process any requests to update as described in more detail herein below.

It will be further appreciated that user client 20 may comprise a non-editor user interface such as user viewer 24 to view the version of the website to be modified and a user cached database 25 to maintain pages (and other entities) locally while editing and viewing. Designer client 30 may also comprise a viewer and editor 34 and a designer cached database 35 to maintain pages (and other entities) locally while editing and viewing. In an alternative embodiment, user client 20 may comprise a viewer and editor to enable a user to make minor changes to a website as described in more detail herein below.

It will be appreciated that data updates to system 100 may arrive from multiple sources, including designer-originated, user-originated and system-originated. Updates may include adding, deleting or modifying data. Modification may include various attributes of the object being modified.

It will also be appreciated that designers may make changes to the website using an editor user interface module (the editor) via viewer and editor 34. These changes may affect site content (e.g. text and images), list information (e.g. items), and list item types. Designers may also manipulate the list items directly, e.g. using a mass loading tool, rather than through the editor.

Users may make more minor changes to a website via viewer 24 when entering or editing user generated content in components which allow such changes (e.g. adding entries to blog component). Users may also make changes which affect an item list (e.g. adding/removing/editing items in the list). Users may have limited and specific editing rights (e.g. the right to edit components inside a specific container). Users accessing an external database or content management system may include an item list associated with the application.

Cached databases 25 and 35 may be in the form of in-memory, on disk or be a remote database and may be used to maintain pages (and other entities) locally while editing and viewing.

System-originated changes may include users operating an external application which affects pages or item lists related to the application (e.g. operating a separate picture loading application which adds pictures to pages or to an item list stored in a content management system associated with the application).

It will be appreciated that different designers and end-users may have specific permissions for specific editing capabilities.

System 100 may be object-based, maintaining an internal data structure and repository of objects (e.g. pages, components, etc.), their attributes and relationships. The actual display on viewers 24 and 34 may be dynamically generated (based on the stored object data) using HTML5, Adobe Flash, a dedicated client application or any other means. It will be appreciated that objects may be either visual objects and stored information objects and that the objects may be also schema defined or system defined.

It will be appreciated that system 100 may handle two levels of website related entities: "upper" management-level entities such as entire websites, projects and media libraries and "lower" design-level entities such as websites pages, page components and media files. The design-level entities are typically contained inside the management level entities.

System 100 may also support various types of relationships between these entities (management level entity—management level entity, management level entity—design level entity and design level entity—design level entity) as described in more detail herein below.

Management level entities may include projects (e.g. collections of websites and other related elements), sub-projects, media libraries (e.g. image collections) and websites including (for example) full/publishable ones, websites being edited or website sections to be used for inclusion in other websites. These may also include regular websites as well as mobile or other device-specific websites. Management level entities may also include third party applications (both third party application libraries as well as stand-alone third party application provided by an external third party application provider) and lists—data item and data type collections (possibly including items conforming to multiple types). Management level entities may also include list applications—collections of definitions and views describing how a list is to be handled, modified and displayed. It will be appreciated that the views themselves are essentially page templates (as described herein below), and are thus design level entities rather than management level entities. List applications are described in US Publication 2014/0282218 published 18 Sep. 2014 and assigned to the common assignee of the present invention.

Management-level entity handling typically includes the handling of users, their profiles and their permission and privileges. Management level entities typically contain design level entities, but may also contain other management level entities (e.g. a system which allows sub-projects and sub-sub-projects).

System 100 may implement any subset of the architecture elements as described herein above, and may also implement specific restrictions on their structure and relationships. For example, system 100 may allow the use of some management level entities (such as third party applications and media libraries) only within the higher-level management level entity including them (e.g. a sub-project), or within the entire project set, or may require a specific hierarchy structure.

A further example of a specific implementation, the Wix web site design system (available at www.wix.com), implements a specific 3-level management level entity hierarchy which includes a Level 1—an account (the collection of meta-sites/media libraries for a specific site owner), a Level 2—the meta-site (i.e. project) and media libraries (image libraries etc.) and Level 3 (all under "meta-site" above)—the website, the mobile site and any third party applications and list applications as described herein above.

It will be appreciated that under the Wix system, each account may have a single unique user (the site owner) that has full management and access privileges for the account. The general model allows multiple such users for each account with specific privileges for each.

Design level entities include the visual building blocks of websites which consist of pages which include components. The pages may have a hierarchical structure, created through the use of container components which may contain other (container or atomic) components. Containers may be single-page or multi-page containers. Multi-page containers (also known as galleries) display multiple mini-pages, each of which has its separate content. Components may include, for example: decoration components (e.g. a shape used in the page design), simple components (e.g. text field, visual frame etc.), media object components (e.g. images, audio, video), complex components (e.g. an integrated map browser) and specific instances of third party applications (defined at the management level entity above).

System 100 may also support templates—complete pages, partial pages or components that are used as a foundation for the creation of instances of the template. The instances are said to inherit from the template. System 100 may further support multi-level inheritance (A inherits from B which inherits from C), multiple inheritance (A inherits from both B and C) and diamond inheritance (A inherits from both B and C, and B and C both inherit from D).

As discussed herein above, system 100 supports the notion of lists, which are collections of items, with each item consisting of data fields. Item structure (i.e. which fields it contains) is defined using a type (also called item type), and different items (even in the same list) may have different types. Items are displayed through views which are templates containing placeholders filled with data from items. A list application may include a linking component definition, an associated list or lists and a set of related item types and views. Views are displayed inside linking components, which are essentially virtual multi-page containers that display virtual mini-pages generated from views and corresponding items in a given list or lists.

A linking component may include filter criteria, used to select which items to display from a list associated with the given linking component. They may also include ordering criteria used to order the selected items. It will be appreciated that ordering criteria may include ordering of items by criteria such as: specific field values, creation or update timestamp, manual ordering and owner (e.g. site owner items always precede items created by other users).

System 100 may also support customizations, such as specific modifications to the views which display specific items. For example, a list application displaying a restaurant menu may require specific customization so to highlight a specific dish in the menu. It will be appreciated that lists and the list applications used to display them are management level entities. The actual list application instance is a designer level entity.

System 100 may classify data lists as a website sub-entity, i.e. a given list "belongs" to a given website and can only be used within the given website. Alternatively, the system may classify lists as generic management level entities, so a given list could be re-used within multiple websites (but possibly limiting the scope of the list to a given project management level entity, e.g. on a given users' set of websites).

It will be appreciated that list databases may be much larger (in volume) and be updated considerably more often than the rest of the website elements. For example, a blog website might have templates and navigation pages (which are rarely updated), but the actual blog entries and talkbacks as data lists. An album publishing website might store the albums, picture and comments as data lists.

As discussed herein above, system 100 may support a variety of possible relationships between management level entities and/or design level entities. Possible relationship types (and examples of their use) may include containment relationships in which websites contain the pages and components. Projects may contain sub-projects which may in turn contain sub-sub-projects etc. and media libraries may be included at the website level, the project level or some combination of specific levels.

Another relationship type may be inheritance. A website might be based on (or otherwise inherited) from a second website. In this scenario, system 100 may support the notion of a main website, and localized or customized versions of the website sharing the same structure by using different textual elements. System 100 may also support template-based inheritance, with a repository of templates being referenced (inherited) in different websites.

Another relationship type may be instantiation. An element (design level entity) inside a management level entity may be an instance of a management level entity or any element thereof. For example, a website may contain an instance of a third party application (which is by itself a management level entity).

The interconnected entities (management level and design level) may form a connection graph, which must contain no circles (i.e. by a Directed Acyclic Graph—DAG)—so a dependency analysis may be performed among these entities (e.g. to determine which entities should be published based on a publish request as further described herein below).

It will be appreciated that object data may be kept in one or more databases. In particular visual data (i.e. pages, components, view, types) may be held separately from list data (actual item content) as described in more detail herein below.

System 100 may be implemented on any combination of underlying database technologies, such as structured databases (e.g. SQL DB's), NoSQL databases, Object-Oriented databases, structure repositories (e.g. XML or JSON repositories) etc. Furthermore, system 100 may use external repositories, such as databases or content management systems) not directly managed by the system. For example, the system may implement a "virtual" list which reflects data stored in external repositories, an external database or content management system, and is not a separate database by itself. System 100 may store media data (e.g. image fields) in an external image repository and third party applications may store some of the data they manage in separate repositories managed by the third party application provider. Since object data is kept in one or more databases, system 100 may store visual data (i.e. pages, components, view, types) separately from the list data (actual item content).

Figure 2A:
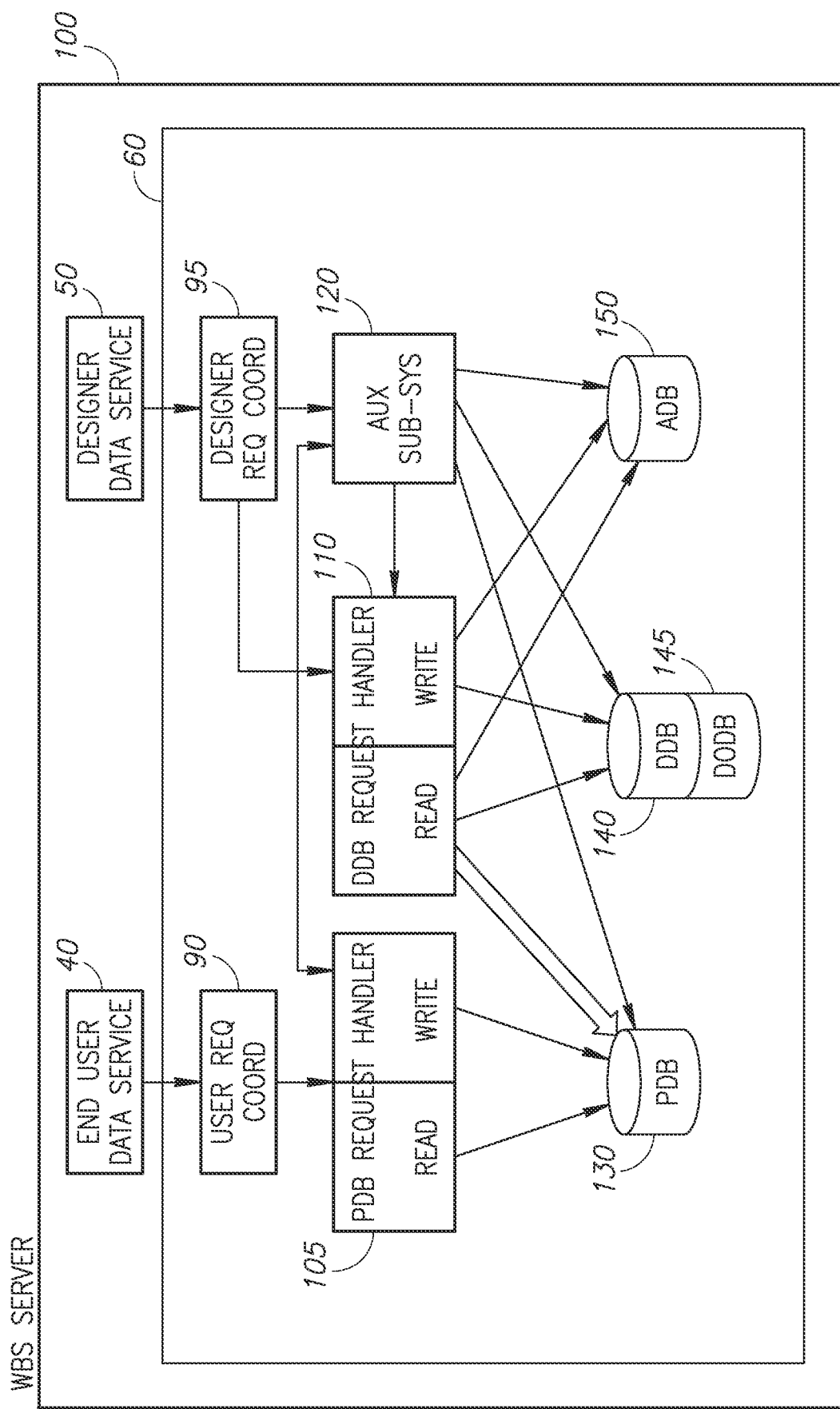
FIGS. 2A and 2B are schematic illustrations of the elements of two embodiments of the modification processor of FIG. 1, constructed and operative in accordance with the present invention.
Figure 2B:
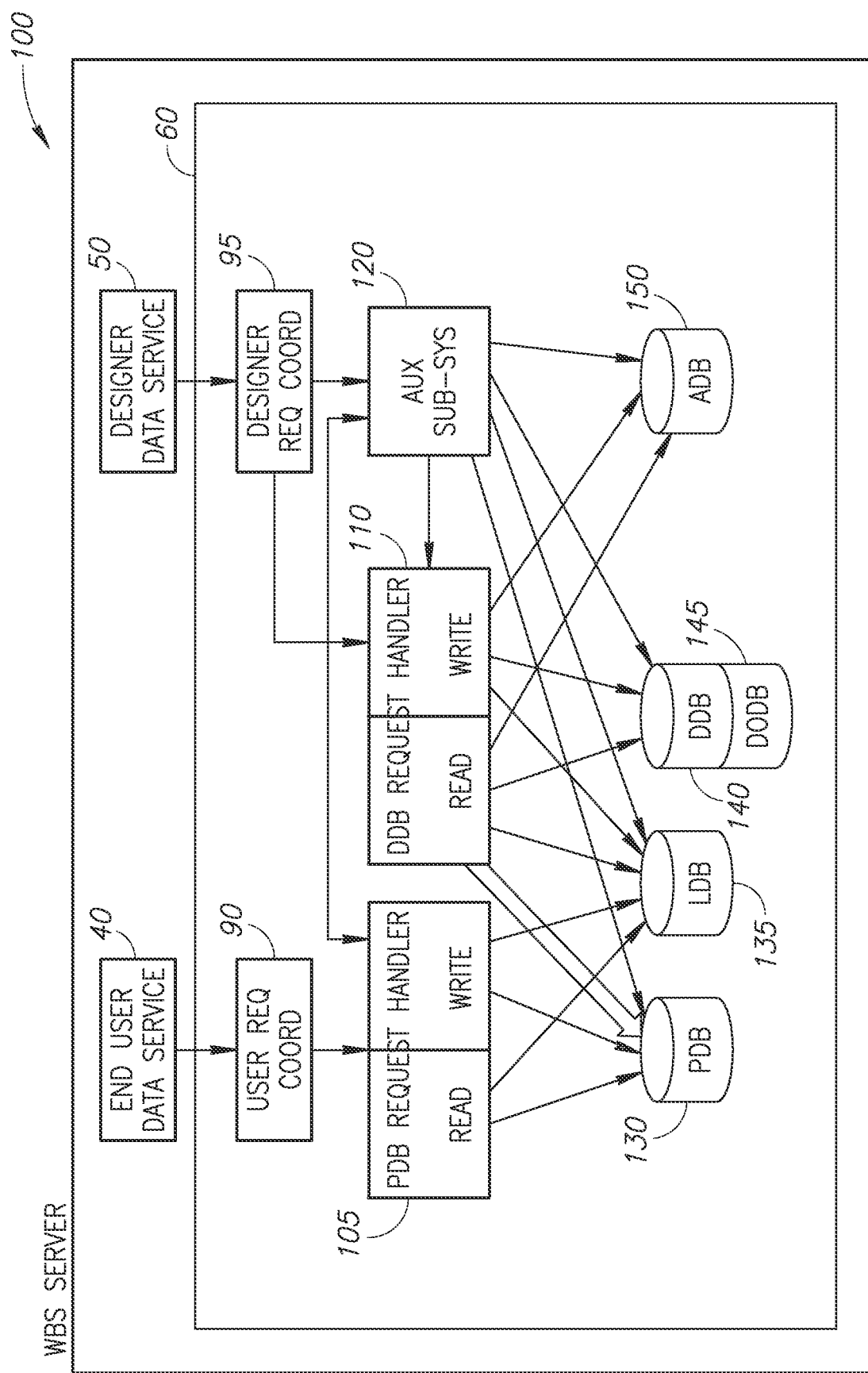

Reference is now made to FIGS. 2A and 2B which illustrate the elements of modification processor 60 and their interaction with user data service 40 and designer data service 50. Modification processor 60 comprises a user request coordinator 90, a designer request coordinator 95, a PDB (published database) request handler 105, a DDB (draft database) request handler 110, an auxiliary sub-system 120, a published database 130, a draft database 140 and an archive database 150. FIG. 2A shows an embodiment where list and list applications are stored on published database 130 and draft database 140 and FIG. 2B shows an embodiment where they are stored in a separate list database 135 as described in more detail herein below. Draft database 140 may further comprise an associated deleted objects database 145 containing the unique ID's of deleted objects as described in more detail herein below.

As discussed hereinabove, many website building and deployment systems use databases or repositories to store details of their websites. It will be appreciated that all databases may manage all elements of the website, including visual pages and components, data items and data types/schemas. Published database 130 may hold complete published objects and represent the current published state of the website, i.e. the website that is seen by a user. Draft database 140 may represent the state of the development website and may hold draft changes made to website objects by designers which have not yet been published and archive database 150 may hold a history of saved and published versions of the database as described in more detail herein below. Both published database 130 and draft database 140 may store all designer level entities and may store some management level entities. Entity types may include and are not limited to templates, website pages, components (regular and list components)—including their parameters (size, position, etc.), customizations—specific customizations (layout, style, position) to specific view field displayed inside a linking component, filtering and sorting criteria, view definitions—components, fields, item types and actual data items. It will be appreciated that although the actual data items are logically in the same database, they may be stored in a separate physical database (e.g. due to their size and rapid updating as noted above).

It will be appreciated that all the databases (the draft database 140, published database 130, list database 135 and archive database 150) may be implemented using current state-of-art database technology—using single or multiple database servers. Such underlying database servers handle the basic details of allowing multiple users to access the same database or repository, preventing physical corruption of the database upon multiple updates, and providing transaction capabilities. All databases (the draft database 140, published database 130, list database 135 and archive database 150) may also be in-memory, locally stored, remotely stored or cloud stored.

Thus, the publish operation (as discussed in more detail herein below) may use the underlying database transaction capability so that the actual update is performed as an atomic unit, and users are not exposed to an inconsistent state of the website.

It will be appreciated that some management level entities are above the published database 130 and draft database 140 design level (e.g. the user definition and what is public) and would therefore not be stored by them.

Published database 130 may also store all resulting non-editor changes and requests to the website including those from user generated content, content managements systems, APIs and any special applications. It will be appreciated that this is not the equivalent to the queued operation storage that may be found in other systems, i.e. published database 130 may store the resulting modified entities and not a series of modification operators. It will also be appreciated that user access (including external applications and API clients) to published database 130 may be either read-only, or only adds new pages or new list items (as described herein above). User access cannot update templates, component attributes or item types.

It will be appreciated that both published database 130 and draft database 140 may be set up as separate server farms (i.e. clusters of different servers). The two server farms may communicate "horizontally" for example to perform a draft database 140 read or a publishing operation. In an alternative embodiment, there may be multiple farms and each server may run published database 130 services and draft database 140 services for a given subset of websites. For example multiple servers may be arranged so that each specific server handles the published database 130 services and draft database 140 services for a specific subset of the handled sites.

User request coordinator 90 may coordinate incoming requests from user client 20 and designer request coordinator 95 may coordinate any incoming requests from designer client 30.

It may also be appreciated that system 100 may further utilize information about the users and the underlying website so as to determine the appropriate handling for website changes. System 100 may also support the dynamic routing of changes so they can be applied directly to published database 130 or stored in the draft database 140 as discussed in more detail herein below.

System 100 may also allow designers to perform complex modifications on all or part of the edited website, and still view the website content—including changes made concurrently by other users (in real-time or near real-time). It may also allow a designer to change the object schema (i.e. item type) without requiring any change to the items associated with the schema being modified. Other designers and users may continue using existing items or creating new items. Publishing the modified schema may be done without requiring item conversion or any downtime, and allows viewing items created with the old schema through the new schema.

System 100 may also track changes as performed by a designer through designer client 30 and may be aware of the specific changes performed on objects and schemas. It may further support smart merging, adapted to the visual component structure of the website and to the specific schema information for the associated data items as discussed in more detail herein below.

Figure 3:
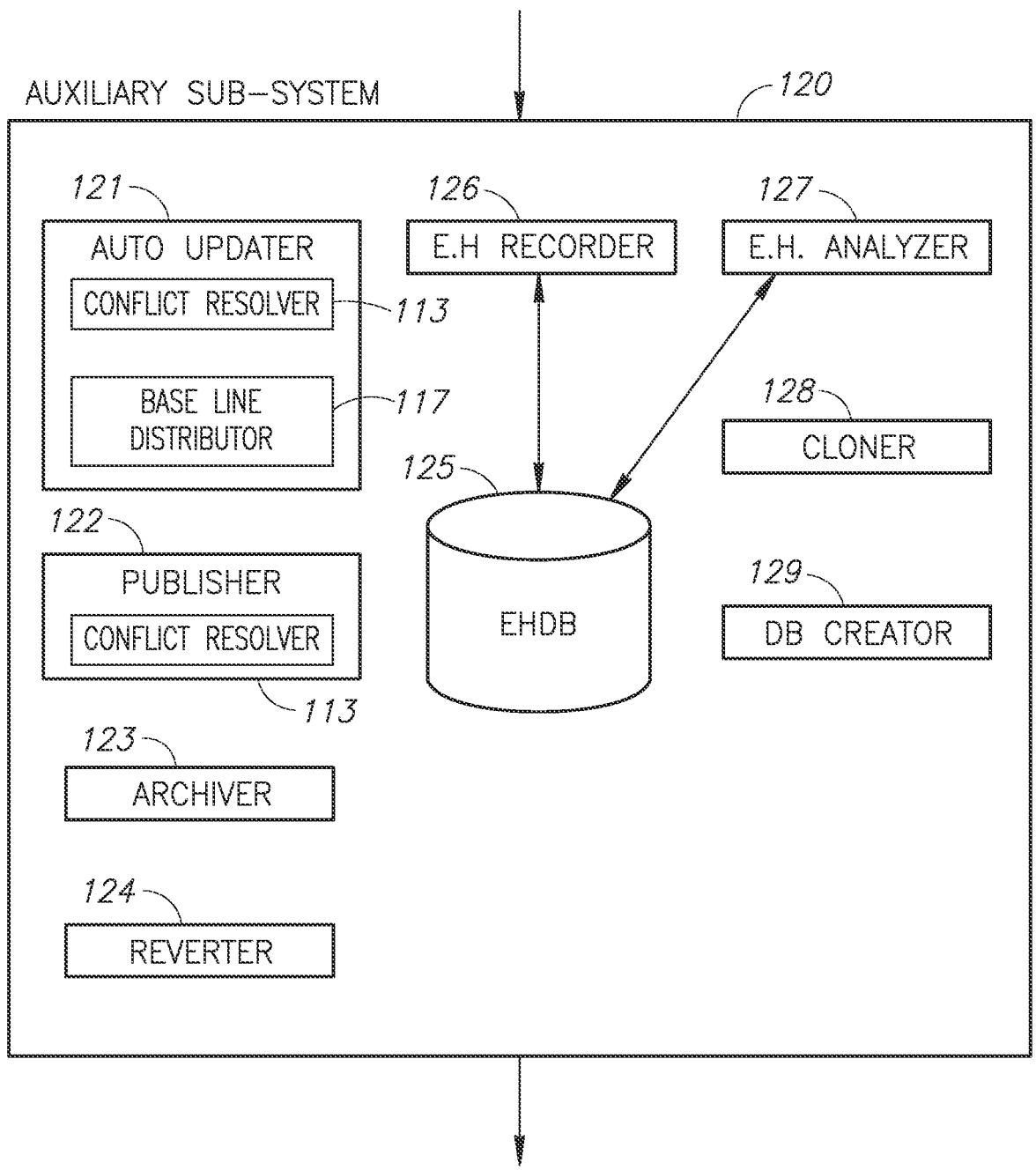
FIG. 3 is a schematic illustration of the elements of auxiliary subsystem of the modification processor of FIG. 2; constructed and operative in accordance with the present invention.

Reference is now made to FIG. 3 which illustrates the elements of auxiliary subsystem 120. Auxiliary subsystem 120 may receive and process additional request types received from designer data service 50 before it sends instructions to published database 130 and draft database 140 as described in more detail herein below. Auxiliary subsystem 120 comprises an auto updater 121, a publisher 122, an archiver 123, a reverter 124, an editing history database 125, an editing history recorder 126, an editing history analyzer 127, a cloner 128 and a database creator 129. The purpose of auxiliary subsystem 120 is to provide additional services related to the published database 130 and/or draft database 140. These services are in addition to read and write request handling which are handled by the request handlers 105 and 110. Auto updater 121 and publisher 122 may further comprise a conflict resolver 113 and auto updater 121 may also comprise a base line distributer 117. Conflict resolver 113 may be required to resolve conflicts caused by incoming changes from multiple sources. For auto updater 121 these may be changes done by other designers, which may be fully committed and integrated into draft database 140, and distributed by auto updater 121 to designers still working on the changes in order to merge them with the specific version edited by them (with conflicts handled by the included conflict resolver 113). For publisher 122, these may be changes done by designers working on draft database 140 and merged with other changes done by the users on the published database 130.

Auto updater 121 may handle notifying a designer about changes that have been made to a site he is editing and may merge any changes made by the other designers or users to the currently edited website. This may be done by a push like process or by designer client 30 polling server 10 for changes. Publisher 122 may publish designer changes held in draft database 140 to published database 130. Archiver 123 may access archive database 150 to read and write archived versions. Reverter 124 may execute revert requests. Editing history recorder 126 may record editing history during editing into the editing history database 125. Editing history analyzer 127 may analyze editing history as a general service for various system elements which use editing history information. Cloner 128 may copy both published database 130 and draft database 140 to a new site and database creator 129 may create a set of databases for the first time.

It will be appreciated that request handlers 105 and 110 may both consist of read and write capabilities to allow both users and designers to view and update the pertinent databases as required. It will be appreciated that a reading from published database 130 may be directly from the database and may include conversions of list items to the last schema version published, and may also perform query rewriting if necessary as described in more detail herein below. A writing to published database 130 may involve writing updates directly to published database 130 and may also involve conflict detection and resolution if complex user edits are allowed. A reading from draft database 140 may include confirming whether an object has been deleted, conversions of list items to modified schemas saved on draft database 140 and performing query rewriting if required. Writing may include merging changes to draft database 140, updating records and conflict detection and resolution when necessary.

Figure 4B:
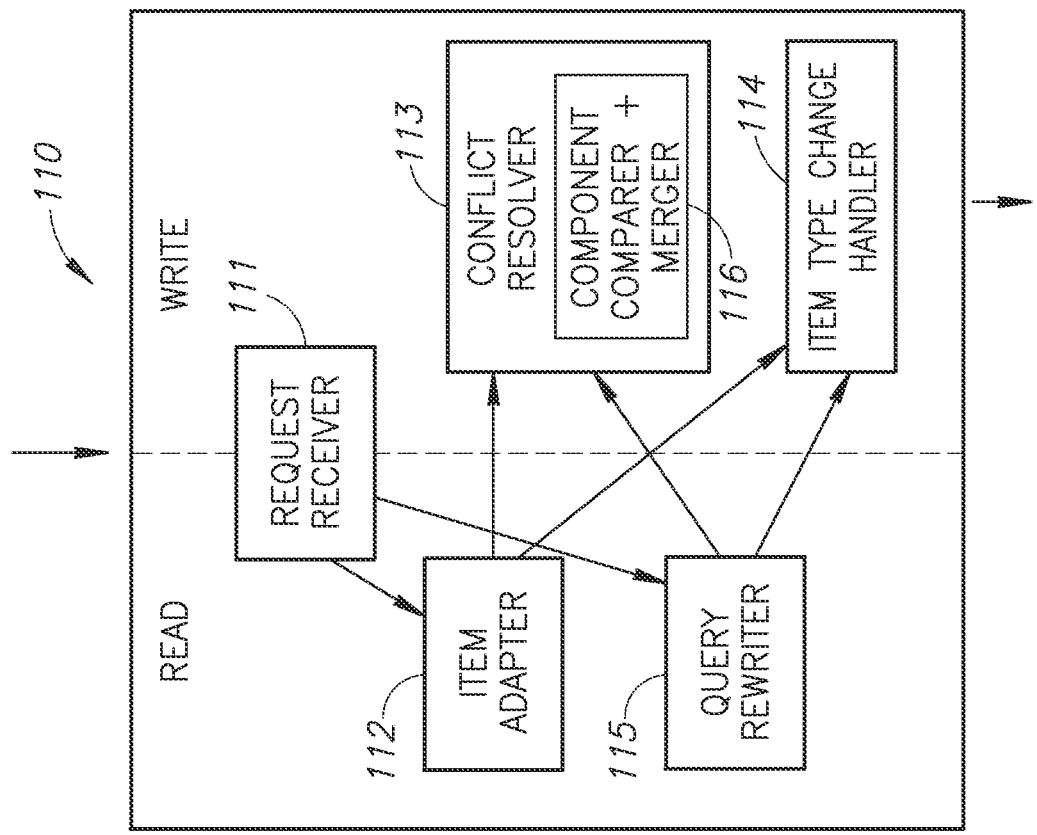
FIGS. 4A and 4B are schematic illustrations of the request handlers of FIGS. 2A and 2B, constructed and operative in accordance with the present invention.
Figure 4A:
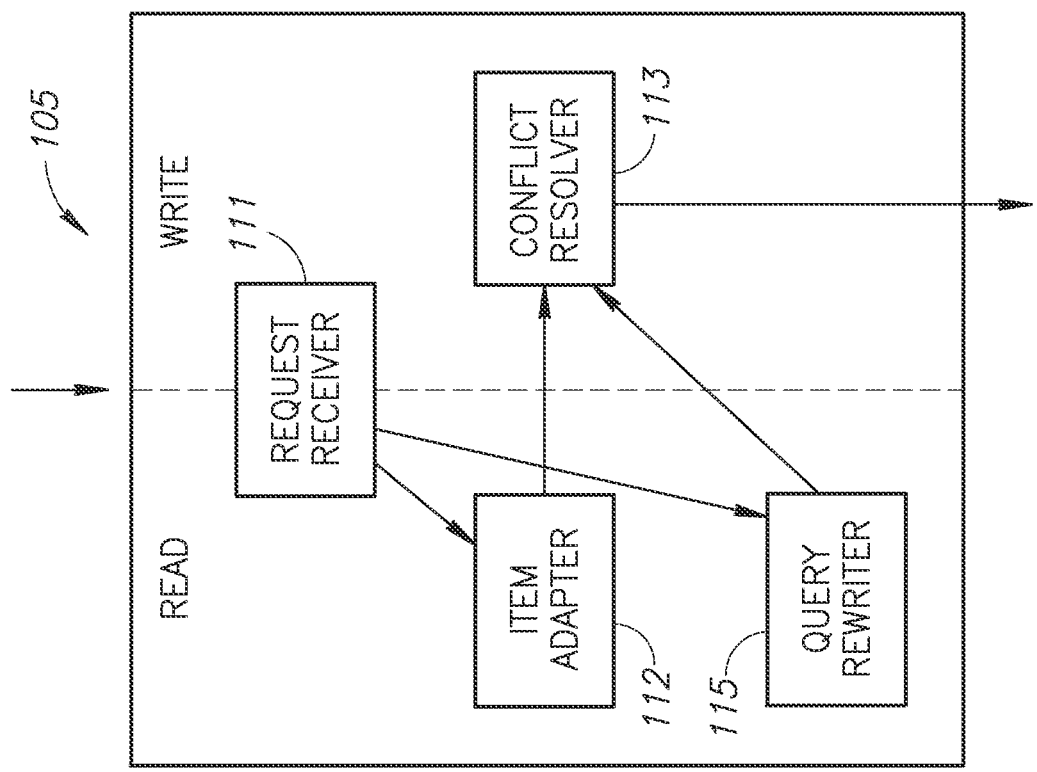

Reference is now made to FIGS. 4A and 4B which illustrate the elements of request handlers 105 and 110 respectively. Request handlers 105 and 110 may comprise a request receiver 111, an item adapter 112, a conflict resolver 113 and a query rewriter 115. DDB request handler 110 may also comprise an item type change handler 114. Conflict resolver 113 may further comprise a component comparer and merger 116.

Request receiver 111 may receive requests from end user data service 40 for either read or write access to published database 130 and item adapter 112 may adapt list items to different schema versions. Conflict resolver 113 may resolve conflicts between versions of a page or object in memory and the current version held when saving the object or page. Item type change handler 114 may handle type definition modification of objects and query re-writer 115 may optimize queries received from a designer or user based on item type changes. Component comparer and merger 116 may perform component oriented comparison and merging to determine different versions of components, resolve any differences and merge versions into a new updated version for use by both users and designers.

As discussed herein above, all changes made by the designer via viewer and editor 34 are stored in draft database 140. This applies to changes to pages, components, list items, item types and views. All other changes (including those from user client 20) may affect published database 130 including changes from viewers of the application (e.g. adding blog comments, viewers given limited editing capabilities), external access to the content management system, external access via an API and external access via special clients, e.g. an iPhone application for adding pictures.

It will be appreciated that system 100 may store change records at a number of levels of granularity (e.g. to optimize storage and processing time) such as the entire object level (e.g. the entire modified page/item/type), specific modified sub-object level (e.g. modified visual components), specific attribute change level (e.g. height of component A changed to Y) and changes involving item types/schemas which require specific item handling and which are discussed in more detail herein below. The hierarchy of possibly reading and modification operations is summarized in FIG. 5 to which reference is now made.

Reading requests coming from non-editor-UI source (such as viewer 24, an external content management system etc.) may be handled directly by PDB request handler 105 which may read the request directly from published database 130. Data reading requests from a designer via viewer and editor 34 may be handled by DDB request handler 110 which may instruct draft database 140 accordingly. Draft database 140 may access published database 130 to retrieve a relevant entity, and may apply any changes (made by the requesting designer) to it so as to return the up-to-date version.

It will be further appreciated that a designer may change an item type (i.e. schema) used to define the structure of data items in the data lists. The changes may include adding or removing a complete type, as well as adding, removing or modifying a field definition inside a type. Such a change may be performed while other users add, delete or modify existing items using the item type being modified. For example, in a real estate database (data list) a designer may add a new "house entrance number" field with a default value of '1' which would be shown for all items in the list. As another example, such a real estate database may have a field with a list of possible values (e.g. city names), and a given city name has to be corrected due to misspelling.

Request receiver 111 (within the pertinent request handler 105, 110) may receive the request from either user request coordinator 90 or designer request coordinator 95 accordingly. For a request to adapt items to a different schema only, it may forward the request to the pertinent item adapter 112. Since actual modification of type may only be performed on draft database 140, a request from a designer to modify a type definition (schema) may be sent to item type change handler 114. It will be appreciated that users may still enter and view the items in published database 130 after the type has been modified by a designer. If a type was changed in draft database 140 via change handler 114 but the change was not yet published (as described in more detail herein below), the user may not see the change and may only see the old item type. Once the change has been published, all accesses (via viewer 24 and viewer and editor 34) may use the new type (except for designer access after a revert operation as further discussed below).

It will be appreciated that the description below applies to a full embodiment of item adapter 112, aimed at "big lists"—lists which include a substantial number of items, or which reflect the content of an external database or repository (which may contain any number of items). System 100 may also support "small lists" (stored in its internal databases and having a smaller number of items) through a simplified embodiment of item adapter 112 as discussed in more detail herein below.

For example, a type t1 is modified by a designer, and as a result, item type change handler 114 may save the modified type t2 to draft database 140. The saved modified type t2 may also include the sequence of modification operations performed on the type t1 to derive t2. The designer may then modify an item A accordingly creating a new modified item A of type t2 (with such change possibly including additional changes and not just type conversion). DDB request handler 110 may save item A, type t2 in draft database 140 (including any subsequent modifications before publishing). It will be appreciated that item A of type t1 in published database 130 and the actual items associated with type t1 are not modified.

Access to item A (read/write/modify) through end user data service 40 may return item A of type t1, since item A of type t2 has not yet been published.

Read access to item A of type t1 by a designer through designer data service 50 may initially read item A of type t1 from published database 130 (if the item exists). If draft database 140 contains a complete new item A (e.g. due to delta granularity dictating saving of entire modified items in draft database 140), DDB request handler 110 may return the new item instead. Otherwise, if draft database 140 contains changes to item A, and in particular a new version t2 of the items' type, item adapter 112 may adapt the item to the modified type t2 and return the modified item record through designer data service 50.

It will be appreciated that when publisher 122 publishes the change (as discussed in more detail herein below), publisher 122 may write item A of type t2 to published database 130. Once publisher 122 has published item A as adapted to type t2, all further requests to read item A may return item A with type t2 format.

It will be appreciated that in order for item adapter 112 to adapt items to different versions of their associated type, it must be able to match the elements of an item built using version t1 of a given type to the same elements in version t2 of a given type. It will be further appreciated that item adapter 112 may perform various schema change operations. It will be also appreciated that a limited implementation of item adapter 112 may only support some of the operations.

Item adapter 112 may use ID-based type handling to handle this process. In this method, all elements of the item type definition are assigned persistent system-wide unique ID's. These typically include the type fields, but may also include additional elements such as possible values from definitions of fields which have a list of possible values.

Item adapter 112 may save the multiple versions of the type (in draft database 140 and later in published database 130), or may retain just the most up-to-date version (except for the saving of changes in the archive database 150 as described in more detail herein below).

If older type versions are saved, item adapter 112 may perform a match between the older type version t1 and the newer type version t2, and the fields associated with the item are adapted according to the changes located between the type versions. If the older type versions are not saved, item adapter 112 may perform a match directly between the fields associated with the item and the newer type definition t2.

Item adapter 112 may also adapt items to different versions of their associated type using change-based type handling. Editing history recorder 126 may track the changes to any given type via viewer and editor 34 and record the sequence of change operations (the change sequence), including the elimination of changes which were un-done or otherwise reversed.

It will be appreciated that item type change handler 114 may have saved the change sequences (to draft database 140 and later to published database 130) together with the modified item type for later use by the item adapter 112. As discussed here in above in relation to item adapter 112, the discussion regarding type change handler 114 applies to a full embodiment, aimed at "big lists". For type change handler 114, system 100 may also support "small lists" (stored in its internal databases and having a smaller number of items) through a simplified embodiment of type change handler 114.

Thus, draft database 140 may contain the entire set of item type versions, together with the change sequences between them. Each item may include a version identifier together with the item type indication.

It will be appreciated that item adapter 112 may still use unique system wide ID's in this method, although alternative techniques (such as using the field names or type-specific ID's) may also be used. It will be further appreciated that the change-based method may have some benefits compared to the ID-based one—for example, it can support complex operations (such as field concatenation or splitting) which cannot be supported by the ID-based method. However, it requires additional storage and processing. Thus, the selection of method to be used is functionality vs. processing decision.

Item adapter 112 may also combine the two methods—performing the quicker ID-based handling when possible, and resorting to change-based handling for more complex modifications.

Possible changes to item types may include a combination of any of the following operations such as add a field, delete a field, rename a field, change the type of field, change the possible value list of a field (add, delete or modify), unite fields and split fields. Item adapter 112 may also support a subset of these operations.

When an item record is read and adapted from its current type to a new type, adapter 112 may handle these type changes as follows:

If the new item type added a field, adapter 112 may add it to the read item record with the default value.

If the new item type removed a field, adapter 112 may remove it from the read item record.

If the new item type renamed a field, adapter 112 may rename the field in the record.

If the new item type changed the type of a field, adapter 112 may convert the field value if possible (e.g. integer to string), otherwise return an error indication in this field.

If a field in the item uses a possible value which was deleted for this field in the new type, adapter 112 may mark the field as error.

If a field in the item uses a possible value which was modified for this field in the new type, adapter 112 may change the value to the modified version of the value.

If the new item type unites fields, adapter 112 may unite the existing fields if possible (i.e. the two fields exist in the previous version and their data type allows uniting).

If the new item type splits a field, adapter 112 may split the field according to the specified methodology if possible (e.g. at a given position in the field).

It will be appreciated that the adapted record is the one returned through the relevant data service 40 or 50.

In case of conversion failure (e.g. a new field was added without a default value and an item record is read to which this field should be added), the designer may be prompted to correct the type definition. Adapter 112 may do this in the following cases:

When DDB request handler 110 reads an item from draft database 140 for display/use by editor and viewer 35, item adapter 112 may adapt it to the most recent version of the type as found draft database 140. The item may be an unmodified item (which is read by draft database 140 from published database 130), or a modified item (which includes modifications or updated version saved in draft database 140). This adaptation may be performed on the record returned by DDB request handler 110 but is not saved to the draft database 140 or the published database 130.

When such an item is written from editor and viewer 34 to draft database 140, the saved version is already adapted to the new type version.

When publisher 122 publishes an item which was modified in editor and viewer 34 (and is thus saved in draft database 140), publisher 122 may write to published database 130 the item adapted to the most recent version of the item type (including possible changes to this item type which are also recorded in draft database 140).

When PDB request handler 105 reads an item from published database 130 for display in viewer 24, item adapter 112 may adapt it to the most recent published version of the type as found in published database 130. This adaptation may be performed on the record returned by PDB request handler 105, but is not saved to draft database 140 or published database 130.

If an item is modified in viewer 24 i.e. a non-editor user interface, it may already be adapted to the most recent published version of the item type (on reading), and would thus be saved to published database 130 adapted to this version.

System 100 may implement an alternative embodiment of item adapter 112 and item type change adapter 114 aimed at "small lists" (as noted above). In such an embodiment, whenever a designer changes an item type from t1 to t2 (and saves the change), item type change adapter 114 immediately performs a batch migration of all items of type t1 in the draft database 140 and adapts them to type t2. Whenever such a type change is published, publisher 122 may instruct item type change adapter 114 to adapt all items of type t1 in published database 130 to the type t2.

It will be further appreciated that system 100 may support a hierarchical arrangement of components having attributes, or component trees. Each node in a component tree may represent a component and may have multiple sub-nodes (e.g. for components inside a container component). Specifically, each node has geometrical attributes (such as position and size) relative to the containing entity.

Conflict resolver 113 may be required to compare (and later merge) two component trees (e.g. the baseline version and a modified version) into a single component tree. Such merging may be automatic, user-guided or both. Component comparer and merger 116 may use a component-oriented comparison and merging based on the hierarchical decomposition of the objects being merged. Component comparer and merger 116 may further use an analysis of the geometry, attributes and content of the compared objects and sub-objects to aid in the comparison. It will be appreciated that the functionality of component comparer and merger 116 is discussed in US Publication No. 2015/0154164 entitled "A System for Comparison and Merging of Versions in Edited Websites and Interactive Applications", published 4 Jun. 2015 and assigned to the common assignee of the present invention.

It will be appreciated that list database 135 (as per the embodiment shown in FIG. 2B) may contain multiple items based on multiple versions of the same type, and different adaptations may have to be performed for each type version. It will be appreciated that in this scenario list database 135 may be handled as published database 130 (when not combined with published database 130 as is illustrated in FIG. 2A) with users having the ability to access and modify it via PDB request handler 105. It will be further appreciated that list database 135 may employ a list versioning algorithm. Alternatively, list database 135 may implement its own arrangement which may include internal published and draft areas, similar to the main published/draft databases used for the non-list website information. It should also be appreciated that even in this embodiment system 100 may classify some lists so they are not stored in the separate list database 135 but use the regular published database 130 and draft database 140 mechanisms. This is typically relevant for small lists which do not represent dynamically changed data, e.g. a list of departments into the company that is tied to the website structure and doesn't change very often.

It will be appreciated that a separate list database may be separately managed e.g. have a separate set of user IDs. The various IDs may be related to each other through the site information. This may be needed for example, to support lists common to multiple databases and users.

It will be appreciated that request handlers 105 and 110 may also delete an item type which has data items associated with it. The deletion is actually a virtual deletion. The type is marked as deleted, but retained in the underlying databases 130 and 140. Thus, items using this type (or any generation thereof) may still work, but the type would not be shown whenever a list of available types is displayed. It will be further appreciated that system 100 may support item duplication—in which case new items can still be created based on a deleted type by duplicating existing items. The type would only be actually deleted once no items are associated with it.

It will be further appreciated that whenever DDB request handler 110 deletes an object (item, page, list etc.), DDB request handler 110 may write its unique ID to deleted objects database 145. It will be further appreciated that when DDB request handler 110 reads an object from draft database 140, it may also consult with deleted objects database 145 to see if there is a match between ID of the item and deleted item ID's. If there is a match, it may notify the viewer and editor 34 that the item no longer exists even though it still may be present in published database 130. It will also be appreciated that when publisher 122 publishes changes to published database 130, it may delete objects in published database 130 which have an ID that match a deleted ID in deleted objects database 145. It will be appreciated that as a result the process is synchronous as opposed to asynchronous.

Query rewriter 115 may optimize queries which refer to new item fields added in new versions of the item type. For example, a new numerical field x has been added in version 6 of the item type B and default value for the field x is 10.

If all items for which the x<15 are requested, query rewriter 115 may automatically include all items with type version earlier than 6 (since the default field value x=10 satisfies the condition x<15). All items for which a value for x has been specified would have already been adapted to version 6 of the item type. This could provide substantial optimization since the item type version may often be indexed by the native underlying database, whereas the field x might not be thus indexed (and require record-by-record testing). In addition to optimization, query rewriter 115 may provide a solution for retrieval using index over "missing fields" (added in a given version of a type). Query rewriter 115 may modify a query referring to such a "missing field" so as to use an index over the fields which includes just the records containing the added field, while ensuring that records in which the field is missing (i.e. records defined using the earlier version of the type without the field) are automatically included or excluded as appropriate.

In a similar manner, if all items for which x>15 are requested, query rewriter 115 may automatically exclude all items with type version earlier than 6.

It will be appreciated that if various conversion rules (which detail specialized conversion methods between different type versions) are supported, it is much harder to use native indices and the underlying database functionality, since field values might be converted on reading from a previous source, thus requiring record-by-record testing of field values. For example, if field x exists in version t1 of a type t, and is replaced by the field y in version t2 of the type t. A complex conversion formula y=func(x) is used when converting x to y. In such a case, the underlying database indexing system might be unable to index x and y together in the same index, and might thus be required to perform explicit comparisons for each retrieved record, instead of performing an indexed query. This can be handled in some cases (but not always) by query re-writing which splits the query into the union of a "pre-change" query and a "post-change" query.

Typical elements of large web sites are galleries which retrieve items according to item tags. For example, a single list repository may contain all items available in a given e-Store, but different pages (e.g. e-store "departments") may contain gallery-type visual components which retrieve items to be displayed according to item tags (e.g. books, music, gadgets, etc.). Such tags may also be available for end-user searching of the repository.

A designer may wish to modify a tag (in a filter criterion as well as in filtered items) due to a spelling mistake in the tag, or some other structural change. It will be appreciated that system 100 has to publish changes to retrieval tags on items and changes to the filter criteria simultaneously—otherwise the site would be broken for some time. A typical large-scale web site is continually on-line, and cannot be easily shut-down for maintenance or database changes.

Thus, the designer may change tags, via editor and viewer 34, used to select items (e.g. in the website galleries), and may also change the tags assigned to specific existing list items. However, both types of changes may be kept in draft database 140 and committed to published database 130 together (when published). As long as the changes are not published, existing users accessing the website (while the change is created) would still see old tags in the gallery visual components (used to display the items) as well as the items, and the website would not be broken.

Once the pertinent changes have been made by a designer to draft database 140, publisher 122 may publish the designer changes as saved in draft database 140 for a given website (or other management level entity such as a project containing multiple websites).

Publisher 122 may expand the publish request to include modifications done in other related management level entities on which the published management level entity relies (tracing the dependency graph of the management level entities). For example, publishing a website may publish changes to related templates and list applications as well. Such dependency analysis is possible since the management level entities form a DAG (as noted above), i.e. there are no circular dependencies.

Publisher 122 may apply all of the changes in draft database 140 for the given website (or other management level entities) to published database 122 (i.e. all pages, components, item, types and views). Publisher 122 may than remove the change records from draft database 140 either physically or logically (e.g. by using a "last update point" pointer or a timestamp query) as discussed herein above.

Publisher 122 may also save a snapshot of the complete website in archive database 150 (as described in more detail herein below), so it can be used as revert-point in the future. The snapshot may include all website elements except for list data items (for all or some of the lists)—discussed in more detail herein below.

As discussed herein above, archive database 150 may keep a list of versions saved or published. Archive database 150 may contain supporting indications such as "published" and "important", version descriptions etc. These may be used to help the designer when selecting a previously saved version for viewing or for revert request. Archiver 123 may store complete element snapshots, or attribute-level differences information (as described here in above for modification request handling).

It will be appreciated that archive database 150 may include a snapshot of visual site elements (pages, templates, containers, components, etc.), item types and item views. Archive database 150 may not include the actual data items stored in some or all of the data lists and any external components and third party applications referenced in the website.

A designer may access (through editor and viewer 34) the list of website versions in archive database 150 and revert to a given version (published or not). The reverted-to version may become the new "recent development" state of the website.

It will be appreciated that the reverting process is "revert for viewing/editing" and may only affect the view presented to the specific designer performing the revert operation. The revert operation may not affect other viewers of the web site until a publish request is made. The designer may easily revert to another version of the website (earlier, later or the latest) before publishing the changes.

Reverter 124 may clear draft database 140 (since the changes done so far are overridden by the reverted-to version). It may then copy the complete reverted-to version from archive database 150 to draft database 140 (excluding list data items as noted above). Even if archive database 150 stores the version in a delta-based format, the full version is generated.

It will be appreciated that this process does not affect published database 130. Thus if reverter 124 reverts to a version earlier than the last published version, published database 130 may still contain a version later then the reverted-to version. This later version would be overwritten when publisher 122 publishes the earlier version now held in draft database 140.

Reference is now made to FIGS. 6A, 6B, 6C and 6D which illustrate different "revert" scenarios.

Figure 6A:
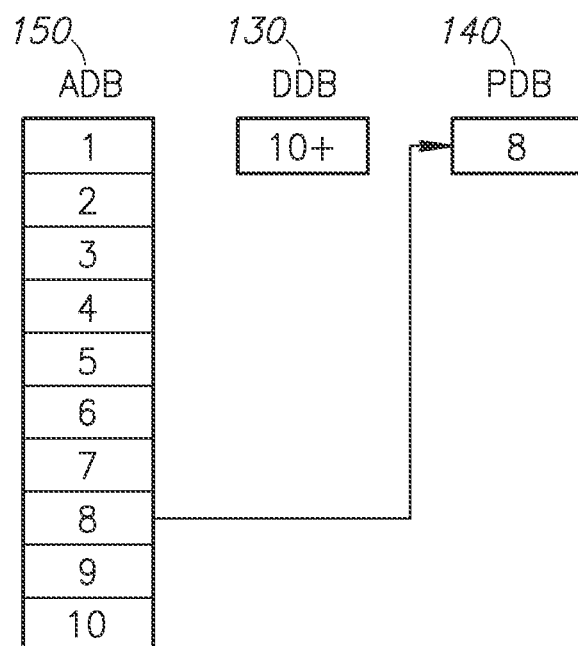
FIGS. 6A, 6B, 6C and 6D are schematic illustrations of different revert scenarios for the system of FIG. 1, constructed and operative in accordance with the present invention.

FIG. 6A assumes that archive database 150 contains versions v1-v10 of the created application or website. The current published version is v8, with v9-v10 being later modified and saved versions based on v8 (which were not published).

Figure 6B:
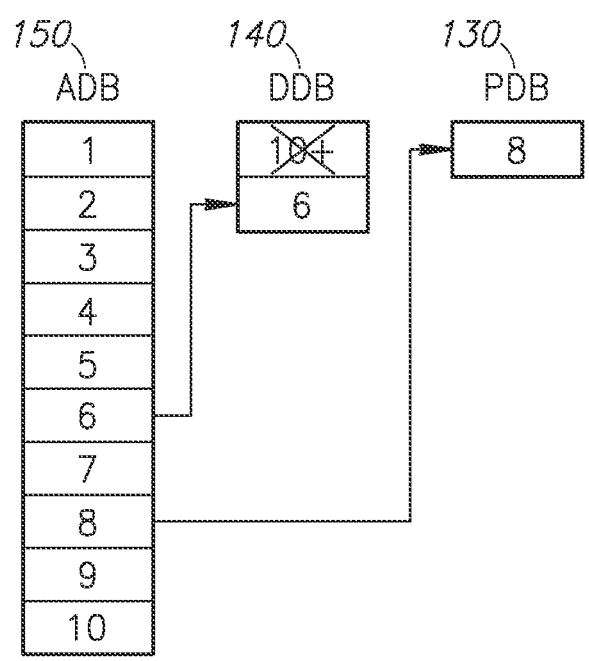

In FIG. 6B, the designer reverts to v6, which is earlier than the published v8. Draft database 140 may then contain the complete v6 (not just differences, but excluding list data items), while the published database 130 would still contain v8. It will be appreciated that changes to v10 (e.g. v10+) included in draft database 140 prior to the revert operation are lost.

Figure 6C:
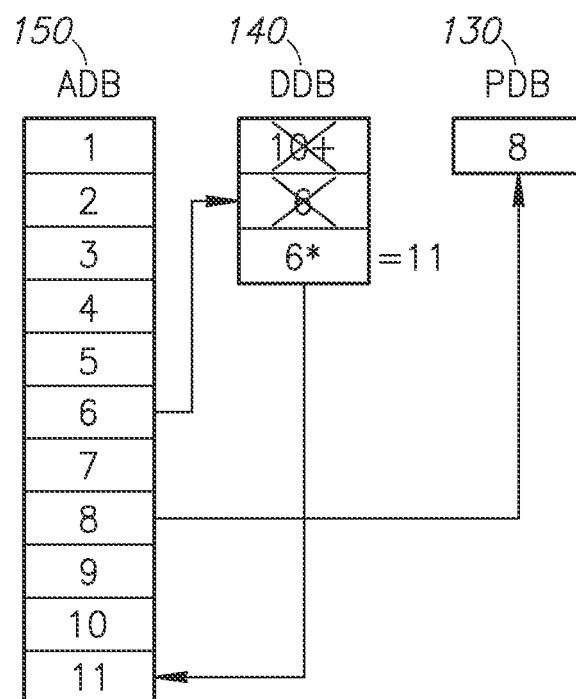

In FIG. 6C, the designer further modifies v6, creating v6* through changes in draft database 140. The designer saves v6*, and it becomes v11 in archive database 150.

Figure 6D:
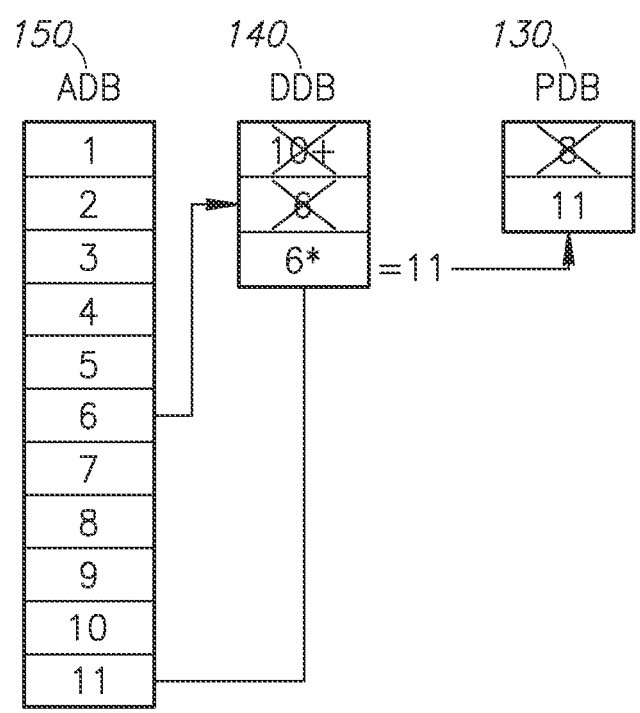

In FIG. 6D, the designer publishes (via publisher 122) v11 (==v6*). Published database 130 is updated with v11 which becomes the current publicly-available version.

It will be appreciated that reverter 124 does not clear archive database 150 after the revert, so a designer could (as in the example above), revert to v6, modify it, save v6* as v11, and then revert again to v9 (or any other version saved in the archive database 150) and continue working with a modified v9* (which would now become v12).

It will be appreciated that this is only applied to the WYSIWYG data, view and types and not to the list items.

As discussed herein above, system 100 may exclude some or all of the list item repositories from the versions saved in archive database 150. Such excluded repositories may be excluded from the reverting process as well. This is because list item repositories may be very large and thus it may not be practical to keep a complete snapshot of them archive database 150.

Furthermore, list item data may be continuously added by users (e.g. blog posts and comments) independently of the website design, this accumulating content may be lost by reverting. Thus, reverter 124 may be limited to handle lists related to the design elements of the site and not to lists related to accumulated content.

Some list item repositories may represent actual, real-world information (such as stock inventory levels) and not application design elements and such. Thus, if (for example) a site was adapted to Christmas for a given period, after Christmas, the design of the site should be rolled back to the pre-Christmas version after the Christmas period. In this scenario, although the look of the site may change, it is desirable not to roll back the inventory levels to those before the Christmas sales.

Publisher 122, archiver 123 and reverter 124 may thus exclude some or all of the list item repositories. Such an exclusion may be determined based on a combination of criteria, such as explicit specification by the application designer, the size of the repositories (e.g. exclude repositories above a given size), the pattern of use of the repository (e.g. does it behave as an accumulating blog repository or not in terms of add/delete/modify requests performed on it/does it represent "real world" data), the frequency and scope of updates to the given list, the classification of users accessing for modification (e.g. does it include user generated content or not) or the storage method of the repository (e.g. create snapshot of internally stored item lists but not of lists stored in an external database).

As discussed herein above with relation to FIG. 2B, system 100 may also employ list database 135 versioning. It will be appreciated that item lists may have different versioning requirements from the "regular" databases and component repositories. In particular, some lists should be excluded from versioning/roll-back as they may include accumulated user information (e.g. accumulating blog talkbacks or video comments) which should not be lost and they may represent physical word data such as inventory levels (which should not be rolled back). However, in many cases a list history and a revert functionality may be desirable for at least some of the lists without storing list information in existing databases 130, 140 and 150. It will be appreciated that lists may be much larger than the amount of data stored in existing databases 130, 140 and 150 and are possibly updated much more frequently. It will be further appreciated that in this scenario, system 100 may use a list versioning algorithm (such as that described in Appendix 1) to provide the required functionality. Such an algorithm may also support list item versioning with minimal overhead and time costs (without storing the list items in archive database 150 and draft database 140).

It will be appreciated that reverter 124 may face a problem when reverting applications containing galleries which select list items according to tags (which have been modified), and not reverting the corresponding list items.

For example, a designer creates a website (version #1) with an item type "printers" having a tag field "manufacturer" with the possible values 'Canon', 'h-p' and 'Xerox'. Users of the website may add data items x1-x5, with some items tagged with 'h-p'. Next the designer decides to update the website by modifying the item type "printers" by correcting 'h-p' to 'HP'. The designer may also modify a filter criteria in a gallery displaying the list to use 'HP' as well as modifying the existing "printers" items tagged with 'h-p' so to use 'HP' (if required). Finally the designer saves the modified version #2 and publishes it using publisher 122.

A user may then add further items x6-x10, some of which are tagged with 'HP'. If the designer then decides to revert from version #2 of the website back to #1, the gallery may revert to use 'h-p' as filter criteria, while the items x1-x10 all still use "HP" (since reverter 124 does not change these items).

It will be appreciated that one solution to this problem may be the use of unique tag ID's. System 100 may use a unique ID that is created whenever a filter criteria tag value (e.g. the 'h-p' above) is created, and may retain this code even if the associated tag text changes. If the data is imported, reverter 124 may generate a unique ID based on the imported values and use this unique ID for the actual queries (instead of the tag text). It will be appreciated that this solves the problems caused by tag renaming or correction, but does not solve (for example) a problem created by "tag splitting", items classified under a given tag are re-classified under a number of possible tags (e.g. when a virtual department is split). It would also not solve a similar "tag uniting" problem.

Another solution may be editor change tracking. As discussed herein above, editing history recorder 126 may save edits in editing history database 125.

Reverter 124 may use the editing history database 125 (through the editing history analyzer 127) and store the tag modification editing history (e.g. the "change h-p to HP" above). This may include the elimination of changes which were un-done or otherwise reversed. Reverter 124 may then apply the chain of such changes to items when loading them so to convert to the current tag values.

It will be appreciated that this is more similar to the way in which item fields are converted from old data type to new data type when adapting to new object schema versions.

Reverter 124 may also use batch conversion, e.g. may perform a batch conversion of existing items upon the publishing of such a change (changing h-p=>HP), and backward batch conversion upon revert. However, such an arrangement may require substantial database locking on publishing and revert—which is not desirable in large web sites.

It will be appreciated that system 100 may support the use of related lists. These are lists that are related to other lists in a hierarchical relationship, similar to the relationship between blog talkbacks list and blog entries list (when block talkbacks are related to specific blog entries).

It will be further appreciated that a potential problem may arise when performing rollback/roll-forward of list items in related lists. For example—talkbacks may be attached to a blog article which was removed due to a revert or rollback to a different version. These talkbacks should reappear on roll-forward. Reverter 124 may determine that the blog and talkback repositories should both be excluded from archive database 150 and thus revert does not apply to them. It will be appreciated that reverter 124 may also use a list versioning algorithm as discussed herein above to solve this problem since the blog and the rollback are part of a set of versions that appear and disappear together, so by using the assumption that they are not deleted on a rollback, the connection between the two lists should remain.

Reverter 124 may also support simultaneous change handling. As discussed herein above, objects (e.g. visual components or list items) may be modified by a designer (through viewer and editor 34) simultaneously with changes made by other designers or by users through viewer 24 or by a content management system etc. System 100 does not lock objects to prevent such concurrent editing, but rather attempts to resolve editing conflicts when saving a modified object.

As discussed herein above, conflict resolver 113 may resolve conflicts between versions of a page or object in-memory and the current version held when saving the in-memory object. I.e. conflict resolver 113 may check that the saved object has not been changed by another user or designer from the last time it was read. It will be appreciated that conflict resolution may involve only part of a page or specific objects. Conflict resolver 113 may implement multiple methods of change detection such as time stamping or adding a hash value and write operations may include all types of change types (add, delete and modify).

The conflict resolver 113 of PDB request handler 105 may also resolve cases in which multiple end users modify the same object.

It will also be appreciated that both auto updater 121 and publisher 122 may also comprise conflict resolver 113. Within publisher 122, conflict resolver 113 may check against concurrent changes within published database 130. In this scenario, conflict resolver 113 may let publisher 122 publish the draft database 140 changes to published database 130.

Conflict resolver 113 may calculate a checksum X of the object as loaded. When trying to save it, it may then calculate the checksum Y of the current value of the object in the pertinent database (130 or 140). If X≠Y, conflict resolver 113 may detect a conflict.

Once conflict resolver 113 has detected a conflict, it may activate a merge—manual or automatic as described US Publication No. 2015/0154164. It will be appreciated that conflict resolver 113 may implement checksums at different levels of granularity such as for the entire site, specific pages, specific components etc.

As discussed herein above, in existing version control systems, a developer typically uses a frozen version (a checkout directory or a branch) of the website being edited. It will be appreciated that updater 121 may designate that a designer sees via viewer and editor 34, a continuously updated version of the application or website being edited. This update of the version being edited may be full or partial, and may be limited in scope. The update may result from accessing databases (e.g. some list items) which are managed outside of the system databases (i.e. the draft database 140 or the published database 130) or from updates from other system users (e.g. from viewers). These updates may be merged automatically into the modified version handled by the designer during work—before this (currently edited) version is merged back into the draft database (upon save) and later into the published database (upon publish).

It will be appreciated that the distribution of changes into edited versions (i.e. the version currently being edited by the designer) may be triggered based on time/frequency setting, designer request, amount of accumulated changes, criticality of accumulated changes or designer pre-setting (e.g. based on changes to a specific component or component class). Base line change distributer 117 may monitor changes from the defined baseline version based on time and frequency setting, designer request, amount of accumulated changes, criticality of accumulated changes or designer pre-setting.

Figure 7:
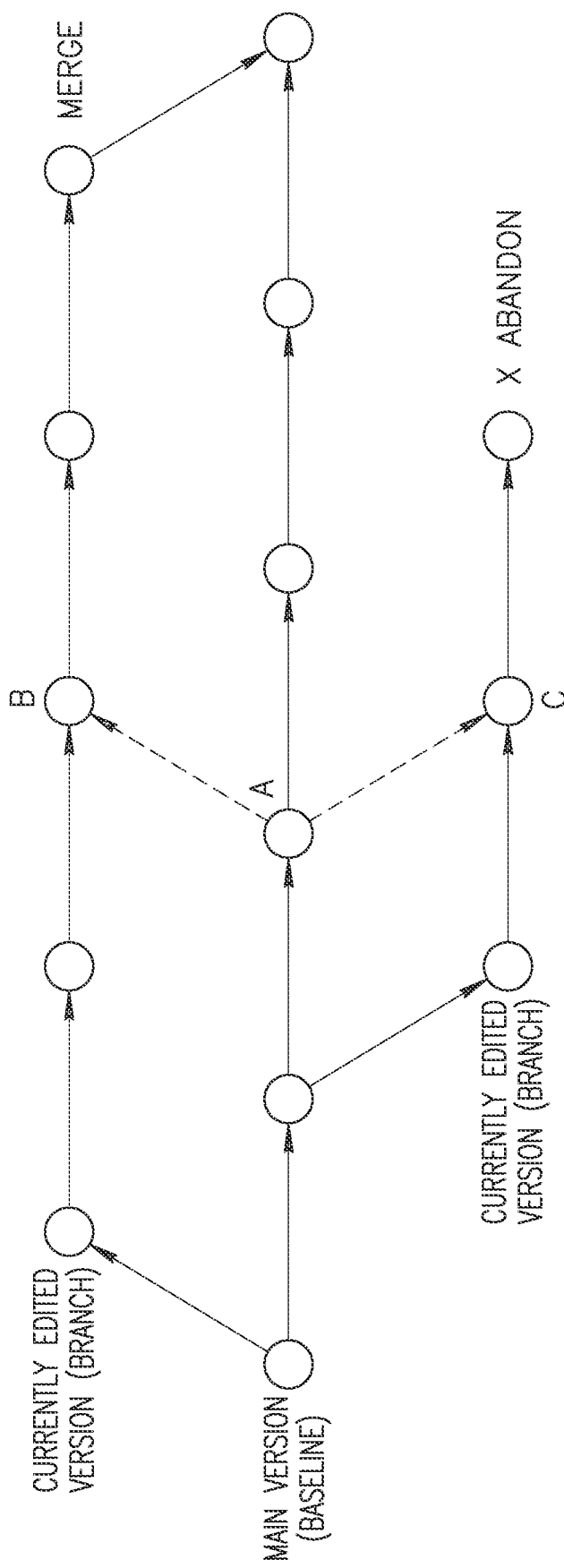
FIG. 7 is a schematic illustration of the function of the auto-updater of FIG. 3; constructed and operative in accordance with the present invention.

Reference is now made to FIG. 7 which illustrates an example of auto updating the distribution of changes into different currently being edited versions or side branches. The main or baseline version A contains changes which are important due to one of the criteria above, and these changes are thus propagated (and merged with) the branch versions B and C. It will be appreciated that although the terminology such as "baseline" (denoting the main version) and "branch" (denoting a version current being edited by the designer but not yet merged with the main (draft database) version) is typically associated with a version control system, as discussed herein above, a typical embodiment of system 100 may not contain a version control system.

Once a version of a website is ready to be published, publisher 122 may write to published database 130 the current version from draft database 140. It will be appreciated that this may overwrite the version currently stored. It will be further appreciated that the publisher 122 may activate archiver 123 which may write to archive database 150 a copy of the version of the website to be published.

Figure 8:
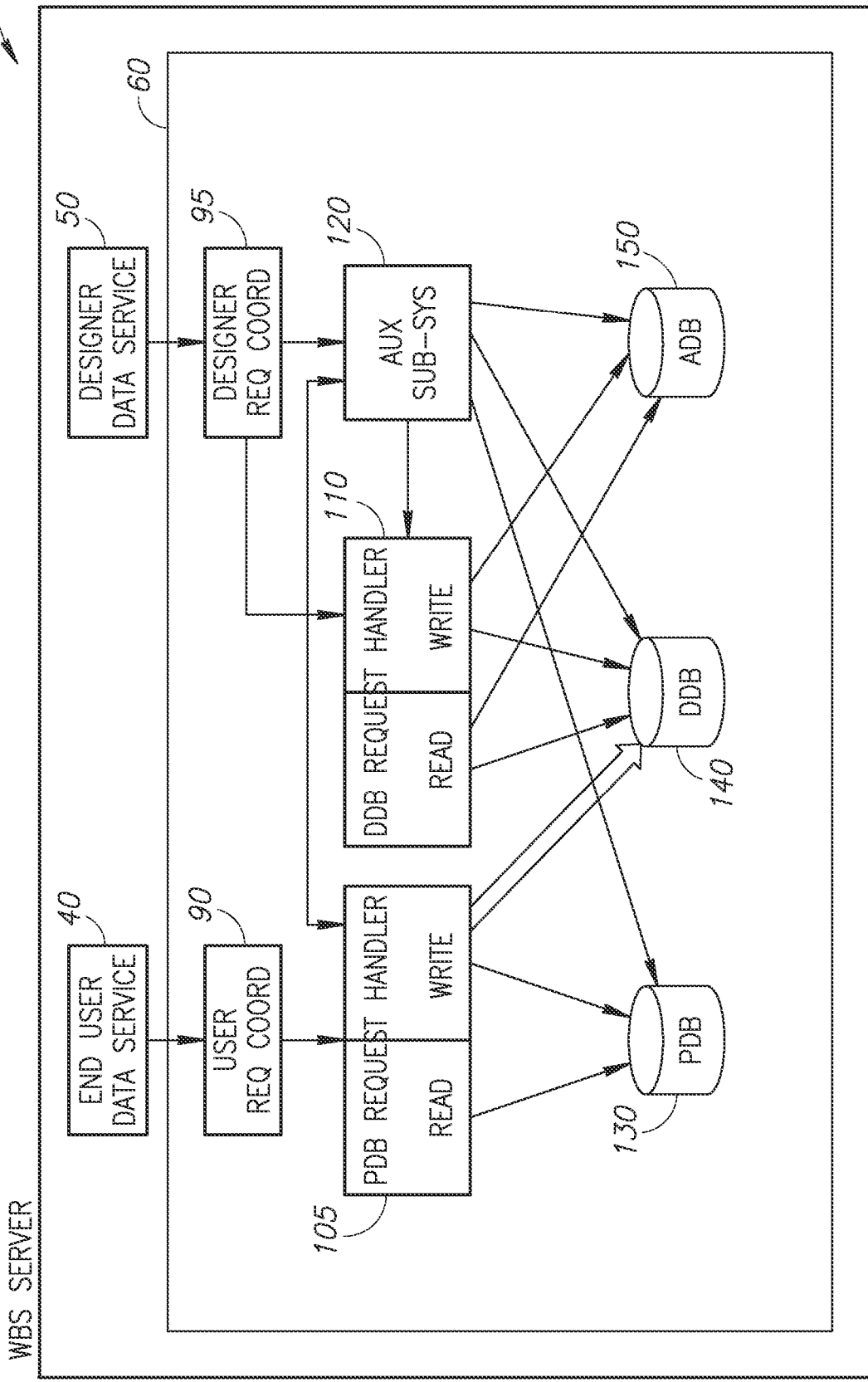
FIGS. 8, 9 and 10 are schematic illustrations of an alternative embodiments to the system of FIG. 1, constructed and operative in accordance with the present invention.

In an alternative embodiment to the present invention as is illustrated in FIG. 8 to which reference is now made, draft database 140 may contain a full and continuously updated copy of the version sitting in published database 130. Changes to published database 130 made by a user, may be automatically written to draft database 140 as well (i.e. in parallel). Therefore draft database 140 is continuously updated with changes made to published database 130. It will be appreciated that in this scenario, changes to draft database 140 are not automatically updated to published database 130. Publisher 122 may mark any incoming changes via PDB request handler 105 as "already published" and may then ignore them when publishing new updates from draft database 140 to published database 130. It will also be appreciated that in this embodiment since draft database 140 contains the current version held in published database 130, all deletions may be performed directly on draft database 140 without the need for deleted objects database 145. Publisher 122 may detect the differences between the two versions held on the two databases and may delete the relevant objects from published database 130. Alternatively, object deletion may be implemented in this embodiment similarly to the previous embodiments, i.e. using a deleted object database 145 embedded inside draft database 140.

Figure 9:
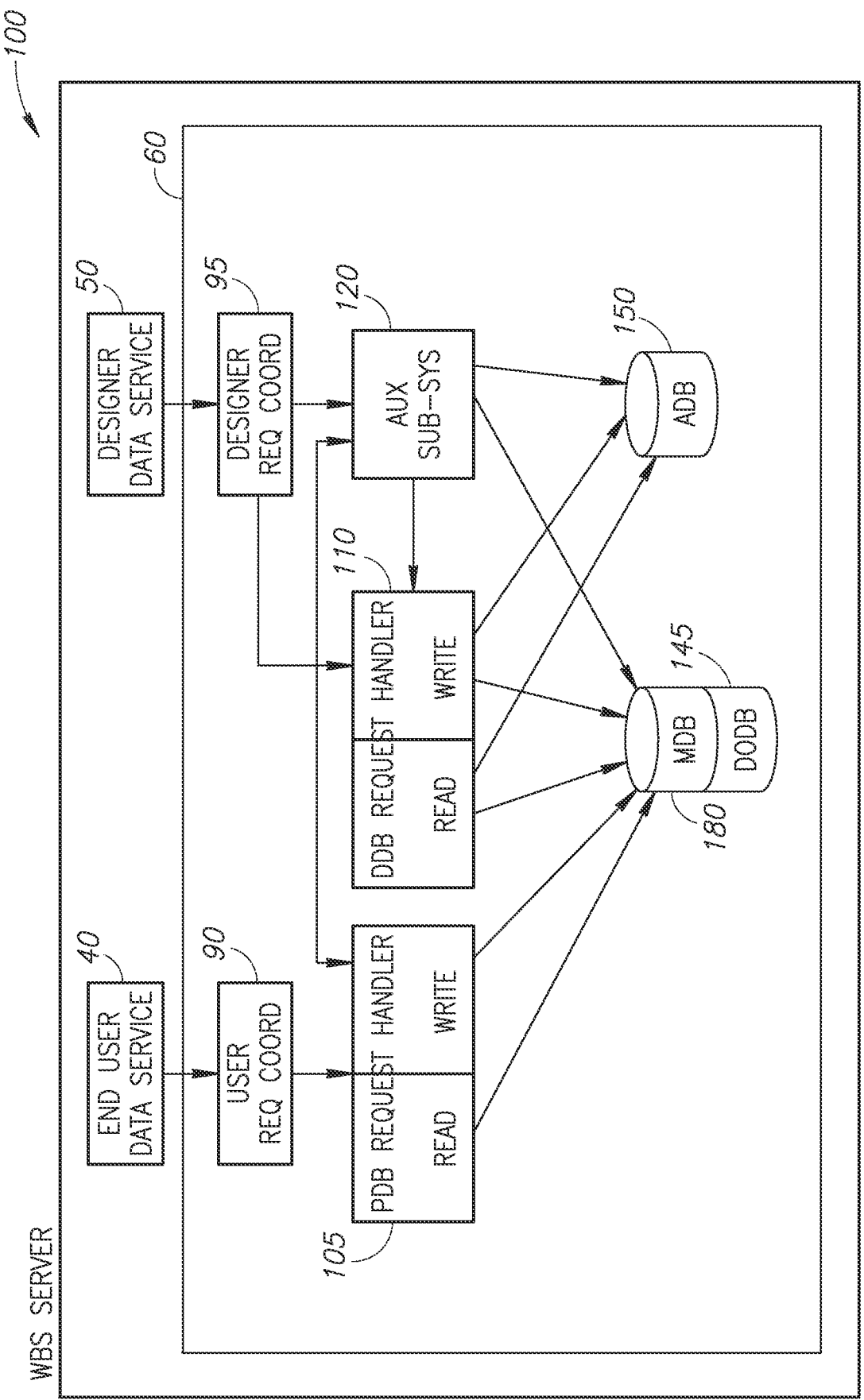

In yet another embodiment to the present invention as is illustrated in FIG. 9 to which reference is now made, published database 130 and draft database 140 may be combined into a merged database 180. Merged database 180 may include multiple instances of a single object record, marked with additional status information including a database version type flag, i.e. whether the object record is associated with the published or the draft database. It will be appreciated that a given record or item may have two versions, a "published" version and a saved but not yet published "draft" version. It will also be appreciated that in this scenario, merged database 180 may comprise deleted objects database 145 for use as described herein above.

Both request handlers 105 and 110 may write records to merged database 180 marking their records as appropriate. It will be appreciated that PDB request handler 105 may read a published version of the record and DDB request handler 110 may read a draft version of the record or the published version if no draft version exists. Publisher 122 may mark any changed draft records as the current published ones and may delete (both logically and physically) the previous published records in merged database 180.

Figure 10:
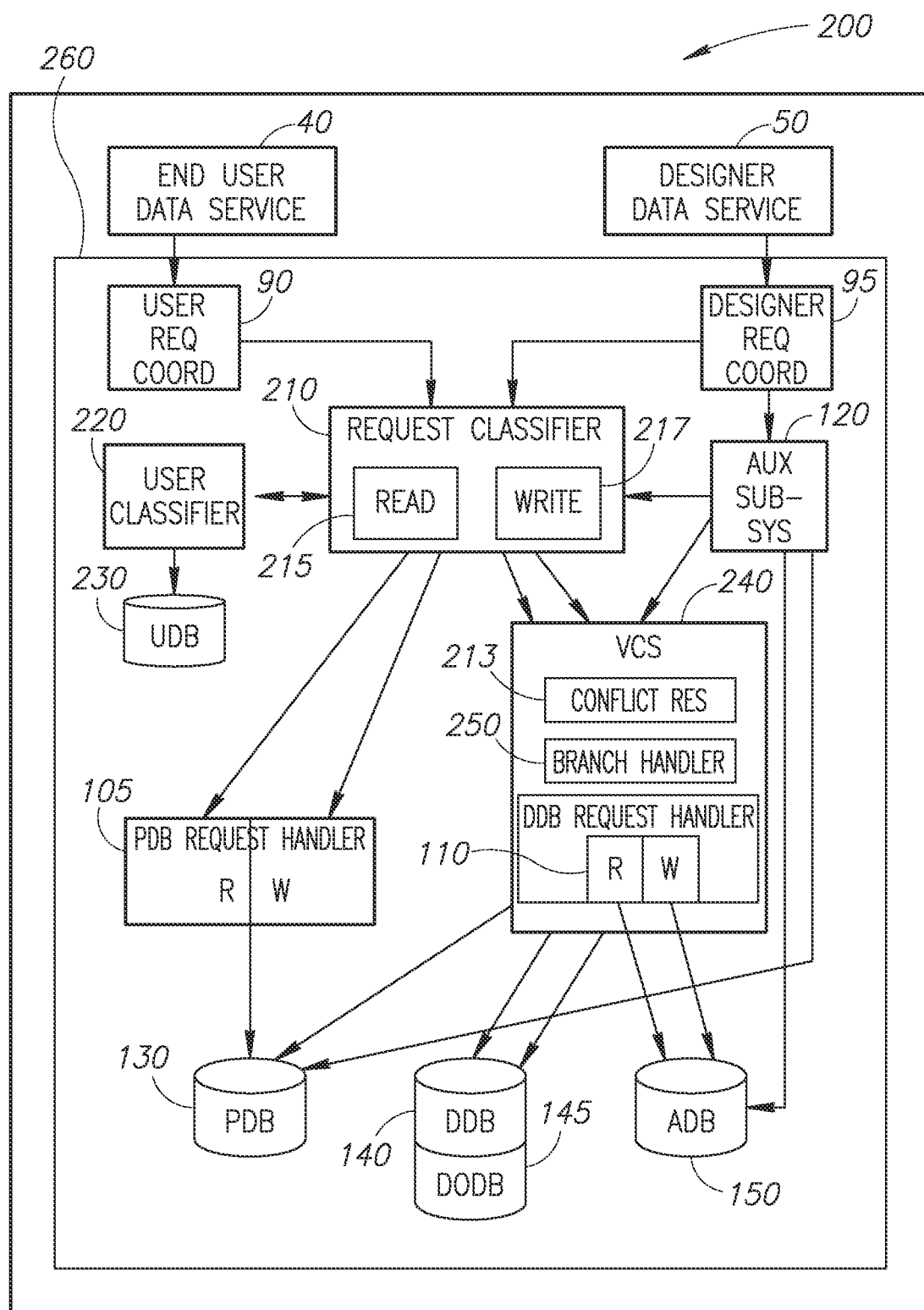

In a further embodiment to the present invention as is illustrated in FIG. 10 to which reference is now made system 100 may be used in conjunction with an underlying version control system. FIG. 10 illustrates a system 200 in which changes are routed dynamically, possible activating version control functionality without requiring the user to explicitly operate a version control system. System 200 may have similar functionality to system 100 but modification processor 260 may also comprise a request classifier 210, a user classifier 220, a user database 230 and a version control system 240. Request classifier 210 may further comprise a write request classifier 217 and a read request classifier 215. Version control system 240 may further comprise a conflict resolver 213, a branch handler 250 and a DDB request handler 110. It will be appreciated that version control system 240 may be purposely designed to work in conjunction with system 100 with the ability to work with objects and provide component based comparison and merging even though it may operate using typical version control system principles and methodologies. It will be further appreciated that for all embodiments, the designer is provided with a published view of the website via editor and viewer 34.

It will be appreciated that although FIG. 10 illustrates a combined published database 130/draft database 140 arrangement, it may also be used with merged database 180.

Request classifier 210 may check all requests (from both designers and end-users) and not just modification requests. This is needed since read requests (by both designers and end-users) may be re-directed to version control system 240 in some cases as they may be read from a branch managed by version control system 240. Request classifier 210 may classify all requests (both read and write) as either direct (performed directly and against published database 130) or indirect (performed through version control system 240, which consults draft database 240 and possibly published database 130).

Request classifier 210 may also consult user classifier 220, as some classification categories depend upon user-related parameters (e.g. classify according to the performing user as discussed herein below). Request classifier 210 may also consult with published database 130 as some classification categories may depend on the application (e.g. classify according to the specification by the application designer).

Request classifier 210 may evaluate requested changes to the managed dataset, and classify them into direct changes, which do not pass through version control 240 and directly modify the baseline, changes which invoke version control 240 and are fully resolved by the modifying user working with version control 240 and changes which are resolved transparently in the context of the specific user (or a set of users), but require version control 240 processing to apply to different communities of users (similar to a workflow system). For example, merging processes which require user interaction might be automatically directed to a different user.

It will be appreciated that request classifier 210 may apply changes differently to different subsets of the user community. Thus, when handling a specific change, some user views may include the change, some user views may not include the change and some user views may include the change only when confirmed and integrated into the baseline version (e.g. by a specific person, or by a person selected from a specific subset of the user community). It will be appreciated that this may apply to object changes, as well as to object schema changes.

Furthermore, request classifier 210 may classify changes according to the method/UI used to perform the change (i.e. changes coming from the editor vs. changes from the content management system), the performing user, the entity being changed, the change type, the scope of change (the amount of elements changed, changes to specific attributes, changes which have a certain (level of) visual effect, conformance to specific rules/guidelines (e.g. every change to non-blue color)) or by specification by the application designer (e.g. as an attribute of the specific entity being modified).

As discussed herein above, request classifier 210 may also operate on read requests so to provide different or altered views to different reading users, based on the relevant criteria from those specified above. Request classifier 210 may make such changes directly. Alternatively, request classifier 210 may include the relevant parameters (user-specific or otherwise) together with the read request data sent to PDB request handler 105 or to version control system 240, and have them perform the required view changes.

Request classifier 210 may route the changes to version control system 240 which may determine how to handle the specific change or change set required by the user (which may be a designer or an end-user). Version control system 240 may then determine whether to open a new branch, apply the change to an existing branch or close the branch of the current website. Version control system 240 may keep multiple branches open so that different users may have different views of draft database 140. Version control system 240 may be activated due to user requests or externally (e.g. to operate in workflow-like mode). It may also work interactively with the user making the request, and also with other (non-requesting) users.

User classifier 220 may access a user profile from user database 230 which may be considered the user profile repository of system 200. This may be used to determine how to handle changes by made by the user (apply directly or through version control system 240) or to determine which version of the site to show when multiple parallel versions are available.

For example, a user A1 makes a change X to the web site. The change X causes version control system 240 to automatically open a branch Y (which will be stored in draft database 140) consisting of the modified version of the site which includes the change X.

Users from the user community A (which includes user A1 as well as users A2, A3, . . . , A17) are all directed (when accessing the site) by request classifier 210 to version control system 240 which provides them with the branch Y information containing change X.

Other users (not from the user community A) are directed by request classifier 210 to published database 130 and would access the website without the change X.

DDB request handler 110 may attempt to merge change X into the baseline—either automatically based on specific criteria (e.g. a given number of accumulated changes) or based on the user's request. Such merging may be successful (e.g. there was no conflict between the change X and the baseline version), or require manual intervention.

Alternatively, senior user A17 is directed (when entering the system) by request classifier 210 to confirm the change X, discard the change X or handle any difficulty in merging the change X with the baseline.

Branch handler 250 may handle open/merge/close branch operations.

Figure 11:
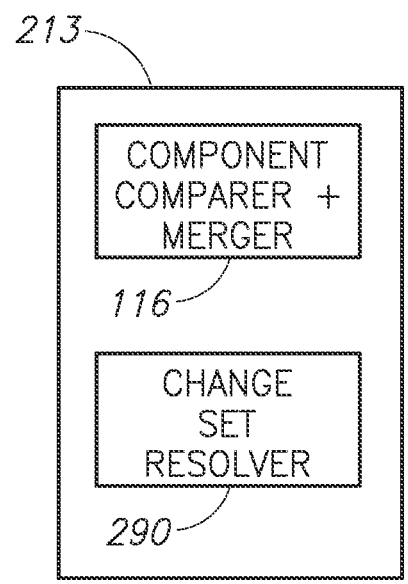
FIG. 11 is a schematic illustration of an alternative embodiment to the conflict resolver of FIG. 3, constructed and operative in accordance with the present invention.

It will be appreciated that in this embodiment, conflict resolver 213 (included within PDB request handler 105, DDB request handler 110, auto updater 121 and publisher 122) may also comprise a change-set resolver 290 as is illustrated in FIG. 11 to which reference is now made. Change-set resolver 290 may integrate between change sets received from the users and designers and version control system 240. Generally, received change sets may not be directly compatible with the functioning of a version control system, for example, a single change-set may affect multiple objects, some of which may be under editing in multiple version control system branches. Furthermore, version control system 240 may be an externally provided system which is integrated into the system 200 and may require adaptation for proper integration. For example, version control system 240 may use different data representation, different change set granularity etc. This adaptation may also be performed by change-set resolver 290.

It will be appreciated that change set resolver 290 may be automatic/semi-automatic/non-automatic or may require user interaction.

It will also be appreciated that version control system 240 users are typically fully aware of their use version control systems and explicitly request operations such as check out, check in and locking.

User classifier 220 may also further perform automatic defining of user communities, which are later used to classify changes. This could be done using any user classification method, such as user class, user type, designer-defined criteria, the physical location of the user, the device or device type through which the user accesses the system, the method by which the user accesses the system and the geographical location of the user.

It will be appreciated that that each of the above mentioned embodiments may be used simultaneously, such as when hosting multiple websites so that one embodiment may be used for one particular website and another embodiment for another set of sites.

Thus different types and levels of users and designers may access and possibly modify different views of a website simultaneously with the required synchronization and without requiring website downtime.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, client/server system or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

APPENDIX 1

1) For each software client (e.g. editor) accessing the list, there is (at any given time) a current effective version. Note that this might be different between different users accessing the same database, so (for example), a user might be working on the most recent version (id=5), whereas a designer could have reverted to a different version (e.g. id=2).
2) In the algorithm below, use the DDB (if designer), PDB (if user).
3) Record reading (designer/user):
    a) Note that there could be multiple instances of a single list item with different version ID's (but only one per version ID). However, in the typical case (a record was just added and not modified later), there would be just a single instance of the record, having the version ID under which it was written.
    b) Read all instances of the list item for the given list_id and item_id.
    c) If non found, return "no list item found";
    d) Locate for each instance the "active" field from the VT table for the given version ID.
    e) Locate the instance with the highest version_id for which active=True.
    f) The two steps above can be done in-memory by the client, or using a SQL Join such as:

```
SELECT LI.*, VT.version_id, VT.active
    From LI, VT
    WHERE      LI.list_id = $list_id
    AND        LI.item_id = $item_id
    AND        LI.version_id=VT. version_id
    AND        VT.active = true
    ORDER BY VT. version_id DESC
    LIMIT 1
``` g) If the selected instance has Deleted=True, return "no list item found". Note that we must check Deleted after the instance selection, since a developer could have deleted the item in v4, reverted to v3 and created v5 based on v3 (thus reviving the item).
    h) Otherwise, return the selected list item instance.
4) Record creation (designer/user):
    a) When list items are created (by users in the PDB or designers in the DDB) they are created with the version_id of the current effective version and a new unique item_id.

5) Record modification (designer/user):
    a) This applies when an existing list item is read, modified and saved.
    b) Get the version under which the item was saved.
    c) If the effective version is identical to the items' original version, overwrite the item record.
    d) It the effective version is different from the items' original version, write as a new record with the effective version as its version.
6) Record deletion (designer/user):
    a) Get the version under which the item was saved.
    b) Create a header-only record with the "Deleted" field set to True and the effective version.
    c) If the effective version is identical to the items' original version, overwrite the item record.
    d) It the effective version is different from the items' original version, write as a new record with the effective version as its version.
7) Publish (designer only):
    a) This is similar to what is done for other changes in the DDB.
    b) Copy the VT table from the DDB to the PDB.
    c) Clear the DDB.
8) Switch/revert to given version (designer only):
    a) Assuming we have a sequence of versions (v1-v5) with published v5, VT would look like:

| Version_id | Parent_id | Active |
|---|---|---|
| 1 | Null | True |
| 2 | 1 | True |
| 3 | 2 | True |
| 4 | 3 | True |
| 5 | 4 | True | b) Revert to a earlier version—e.g. id=2—would do the following:
        i) Set the versions following it to Active=False.
        ii) Assign a new effective version_id following the last one (6 in this case). The assignment is potential in the sense that it would become permanent (creating a new record in VT) only when a change is made to any list item and is actually saved to the database. This way, if a designer switches between a number of versions just so to preview how they look, he or she will not create a series of unneeded new versions.
        iii) The new VT table would be (once the potential version 6 is made permanent):

| Version_id | Parent_id | Active |
|---|---|---|
| 1 | Null | True |
| 2 | 1 | True |
| 3 | 2 | False |
| 4 | 3 | False |
| 5 | 4 | False |
| 6 | 2 | True | c) If we revert again—for example to version 4:
        i) The newly created "branch" (id=6) is "abandoned" (with any list items saved under id=6 would revert to the latest previous version (if any)).
        ii) Version 3 & 4 are marked as active again.
        iii) We create a new version (id=7) for any items created or modified. As noted above, the assignment is "potential", and the additional record would be created in VT only when an item is actually modified and saved.

iv) The new VT table would be (once the potential version 7 is made permanent):

| Version_id | Parent_id | Active |
|---|---|---|
| 1 | Null | True |
| 2 | 1 | True |
| 3 | 2 | True |
| 4 | 3 | True |
| 5 | 4 | False |
| 6 | 2 | False |
| 7 | 4 | True |

What is claimed is:

1. A system for modifying a website or interactive application, said system comprising:
a processor; and
a unit running on said processor for managing amendments to a currently edited website from at least two sources when said website is running, said unit comprising:
a published database to present the current published state of objects of said website;
a draft database accessible, viewable and editable by said at least two sources to store at least edits to said objects of said published database; and
an auxiliary system to update said published database according to said edits and editing history of said website, wherein said auxiliary system comprises an auto updater to notify at least a first source as to changes made to said currently edited website by a second source and to merge said changes to said currently edited website, said auxiliary system comprising:
an editing history recorder to record editing history during editing by said at least two sources into an editing history database; and
an editing history analyzer to analyze said editing history in said editing history database.

2. The system according to claim 1 wherein said auxiliary system further comprises:
a publisher to publish at least one of: said changes and a subset of said changes from said draft database to said published database and to clear said changes from said draft database; and
a database creator to create said published database and said draft database the first time they are used; and at least one of:
an archiver to store and retrieve at least one of full and partial archive versions of said objects in an archive database;
a reverter to revert said objects held in said draft database to a version from said archive database, said version being at least one of an earlier or later than the version of said currently edited website, and wherein said version from said archive database becomes the currently edited version and wherein said revert is limited to non-list data and includes support to tag attribute changes through tag editing history tracking or tag ID matching; and
a cloner to create copies of said published database and said draft database.

3. The system according to claim 2 wherein said draft database, said published database, said editing history database and said archive database are combined in a single database.

4. The system according to claim 2 wherein said draft database, said published database, said editing history database and said archive database are at least one of: a database, an object repository, a markup language file collection and a file system.

5. The system according to claim 2 wherein said draft database, said published database, said editing history database and said archive database are at least one of: in-memory, locally stored, remotely stored and cloud stored.

6. The system according to claim 1 wherein said auto updater comprises a baseline distributer to monitor changes from a defined baseline version of said objects of said currently edited website in said draft database.

7. The system according to claim 6 wherein said baseline distributer is activated by at least one of time and frequency setting, designer request, amount of accumulated changes, criticality of accumulated changes and designer pre-setting.

8. The system according to claim 1 wherein said auto updater comprises a conflict resolver to resolve conflicts caused by edits from said at least two sources.

9. The system according to claim 8 wherein said conflict resolver is at least one of automatic, semi-automatic and manual.

10. The system according to claim 1 wherein said at least two sources are at least one of: user originated, designer originated and system originated.

11. A method for a website or interactive application, said method comprising:
managing amendments to a currently edited website from at least two sources when said website is running, said managing comprising:
storing in a published database the current published state of objects of said website;
storing at least edits to said objects of said published database in a draft database accessible, viewable and editable by said at least two sources to; and
updating said published database according to said edits and editing history of said website, wherein said updating comprises notifying at least a first source as to changes made to said currently edited website by a second source and to merge said changes to said currently edited website; said updating comprising:
recording editing history during editing by said at least two sources into an editing history database;
analyzing said editing history in said editing history database.

12. The method according to claim 11 wherein said updating further comprises: publishing at least one of: said changes and a subset of said changes from said draft database to said published database and clearing said changes from said draft database; and creating said published database and said draft database the first time they are used; and at least one of: storing and retrieving at least one of full and partial archived versions of said objects in an archive database; reverting said objects held in said draft database to a version from said archive database, said version being at least one of an earlier or later than the version of said currently edited website, and wherein said version from said archive database becomes the currently edited version and wherein said reverting is limited to non-list data and includes support to tag attribute changes through tag editing history tracking or tag ID matching; and creating copies of said published database and said draft database.

13. The method according to claim 12 wherein said draft database, said published database, said editing history database and said archive database are combined in a single database.

14. The method according to claim 12 wherein said draft database, said published database, said editing history database and said archive database are at least one of: a database, an object repository, a markup language file collection and a file system.

15. The method according to claim 12 wherein said draft database, said published database, said editing history database and said archive database are at least one of: in-memory, locally stored, remotely stored and cloud stored.

16. The method according to claim 11 wherein said notifying at least a first source comprises monitoring changes from a defined baseline version of said objects of said currently edited website in said draft database.

17. The method according to claim 16 wherein said monitoring changes is activated by at least one of time and frequency setting, designer request, amount of accumulated changes, criticality of accumulated changes and designer pre-setting.

18. The method according to claim 11 wherein said notifying at least a first source comprises resolving conflicts caused by edits from said at least two sources.

19. The method according to claim 18 wherein said resolving conflicts is at least one of automatic, semi-automatic and manual.

20. The method according to claim 11 wherein said at least two sources are at least one of: user method, designer originated and system originated.

* * * * *